United States Patent
Oberg

(10) Patent No.: US 12,198,724 B1
(45) Date of Patent: Jan. 14, 2025

(54) CODEWORD INTERLEAVING OVER MAGNETIC MEDIA SURFACES

(71) Applicant: Marvell Asia Pte Ltd, Singapore (SG)

(72) Inventor: Mats Oberg, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 18/357,790

(22) Filed: Jul. 24, 2023

Related U.S. Application Data

(60) Provisional application No. 63/391,840, filed on Jul. 25, 2022.

(51) Int. Cl.
  G11B 20/18 (2006.01)
  G11B 20/02 (2006.01)
  G11B 20/12 (2006.01)

(52) U.S. Cl.
  CPC ........ *G11B 20/1866* (2013.01); *G11B 20/025* (2013.01); *G11B 20/1217* (2013.01)

(58) Field of Classification Search
  None
  See application file for complete search history.

(56) References Cited

U.S. PATENT DOCUMENTS

| | | | |
|---|---|---|---|
| 5,420,730 A | 5/1995 | Moon et al. | |
| 5,535,067 A | 7/1996 | Rooke | |
| 5,636,075 A | 6/1997 | Nishimura et al. | |
| 6,023,386 A | 2/2000 | Reed et al. | |
| 6,175,319 B1 | 1/2001 | Schneider et al. | |
| 6,501,610 B1 | 12/2002 | Sugawara et al. | |
| 6,574,754 B1 | 6/2003 | Smith | |
| 7,236,911 B1 | 6/2007 | Gough et al. | |
| 8,508,878 B1 | 8/2013 | Zou et al. | |
| 8,508,879 B1 | 8/2013 | Zou et al. | |
| 8,792,197 B1 | 7/2014 | Wilson et al. | |

(Continued)

FOREIGN PATENT DOCUMENTS

| | | |
|---|---|---|
| JP | 10255402 | 9/1998 |
| JP | 2006031825 | 2/2006 |
| WO | 2020185792 | 9/2020 |

OTHER PUBLICATIONS

"Extended European Search Report", EP Application No. 19192790.4, Jan. 3, 2020, 7 pages.

(Continued)

*Primary Examiner* — Daniel F. McMahon
(74) *Attorney, Agent, or Firm* — Colby Nipper PLLC

(57) ABSTRACT

The present disclosure describes aspects of codeword interleaving over magnetic media surfaces. In some aspects, segments of a codeword are spread or interleaved across multiple surfaces of magnetic storage media. Data for one or more codewords may be received by a read/write channel and, for each codeword, a respective index is selected, received, or generated. The index may indicate which sector partitions of the multiple surfaces that segments of one of the codewords are to be written. The data of the codewords can be segmented and then arranged in an interleaver based on the respective index to which the codeword corresponds. The codeword segments are written from the interleaver to sectors of the multiple surfaces of the magnetic media. By so doing, codewords may be spread across multiple surfaces, such that a loss of a portion of a segment track does not prevent readback and decoding of the codewords.

20 Claims, 17 Drawing Sheets

(56) References Cited

U.S. PATENT DOCUMENTS

| | | | |
|---|---|---|---|
| 8,873,181 | B1 | 10/2014 | Zou et al. |
| 8,929,013 | B1 | 1/2015 | Mastrocola et al. |
| 9,059,737 | B2 | 6/2015 | Coker et al. |
| 9,530,447 | B2 | 12/2016 | Gao et al. |
| 10,056,920 | B1* | 8/2018 | Chen ................. H03M 13/6516 |
| 10,068,609 | B1 | 9/2018 | Mostafa et al. |
| 10,115,415 | B1 | 10/2018 | Tang et al. |
| 10,276,198 | B1 | 4/2019 | Katchmart et al. |
| 10,734,016 | B2 | 8/2020 | Oberg et al. |
| 10,937,453 | B1* | 3/2021 | Butt ........................ G06F 3/067 |
| 10,971,187 | B2 | 4/2021 | Katchmart |
| 10,984,822 | B2 | 4/2021 | Oberg et al. |
| 11,061,582 | B2 | 7/2021 | Oberg |
| 11,200,911 | B1* | 12/2021 | Burton ................... G11B 5/012 |
| 2004/0201913 | A1 | 10/2004 | Sutardja |
| 2010/0241922 | A1 | 9/2010 | Furuhashi et al. |
| 2014/0244926 | A1 | 8/2014 | Yang et al. |
| 2015/0062738 | A1* | 3/2015 | Yang ..................... H03M 13/27 360/48 |
| 2016/0292033 | A1* | 10/2016 | Cideciyan .......... G11B 20/1833 |
| 2018/0060192 | A1 | 3/2018 | Eggert et al. |
| 2018/0173439 | A1* | 6/2018 | Cideciyan ............. G06F 3/0619 |
| 2019/0189156 | A1* | 6/2019 | Butt ................... G11B 5/00813 |
| 2020/0066299 | A1 | 2/2020 | Oberg et al. |
| 2020/0202893 | A1 | 6/2020 | Katchmart |
| 2020/0251143 | A1 | 8/2020 | Nangare |
| 2020/0272339 | A1* | 8/2020 | Oberg ................ G11B 20/1809 |
| 2020/0294549 | A1 | 9/2020 | Katchmart |
| 2020/0342900 | A1 | 10/2020 | Oberg et al. |

OTHER PUBLICATIONS

"Extended European Search Report", EP Application No. 20154549. 8, Jul. 2, 2020, 6 pages.

"Foreign Office Action", EP Application No. 20154549.8, Jan. 4, 2022, 6 pages.

"Foreign Office Action", EP Application No. 20710611.3, Jan. 4, 2023, 5 pages.

"Foreign Office Action", EP Application No. 20154549.8, Apr. 4, 2023, 5 pages.

"Foreign Office Action", EP Application No. 19192790.4, Oct. 21, 2021, 5 pages.

"International Preliminary Report on Patentability", Application No. PCT/IB2020/051657, Aug. 25, 2021, 8 pages.

"International Preliminary Report on Patentability", Application No. PCT/US2020/021911, Dec. 3, 2020, 6 pages.

"International Search Report and Written Opinion", Application No. PCT/IB2020/051657, May 19, 2020, 14 pages.

"International Search Report and Written Opinion", Application No. PCT/US2020/021911, Jun. 2, 2020, 13 pages.

"Notice of Allowance", U.S. Appl. No. 16/545,966, Mar. 23, 2020, 7 Pages.

"Notice of Allowance", U.S. Appl. No. 16/801,506, Mar. 31, 2021, 8 pages.

"Notice of Allowance", U.S. Appl. No. 16/812,960, Dec. 9, 2020, 5 pages.

"Notice of Allowance", U.S. Appl. No. 16/928,971, Dec. 16, 2020, 8 pages.

"Pre-Interview Communication", U.S. Appl. No. 16/812,960, Oct. 2, 2020, 7 pages.

"Run-Length Limited", URL: https://en.wikipedia.org/wiki/Run-length_limited, Oct. 18, 2019, 10 pages.

Xu, et al., "Health Status Assessment and Failure Prediction for Hard Drives with Recurrent Neural Networks", IEEE Transactions on Computers, vol. 65, No. 11, Nov. 2016, 7 pages.

"Foreign Office Action", EP Application No. 20710611.3, Nov. 14, 2024, 5 pages.

* cited by examiner

CODEWORD INTERLEAVING OVER MAGNETIC MEDIA SURFACES

CROSS REFERENCE TO RELATED APPLICATION

This present disclosure claims priority to U.S. Provisional Patent Application Ser. No. 63/391,840 filed Jul. 25, 2022, the disclosure of which is incorporated by reference herein in its entirety.

BACKGROUND

Electronic devices provide many services to modern society. These services enable an electronic device to provide entertainment, assist with scientific research and development, and provide many modern-day conveniences. Many of these services create or use data, which the electronic device stores. This data may include digital media such as books or movies, algorithms that execute complex simulations, personal user data, applications, and so forth. To avoid exceeding data storage limits, it is beneficial to increase the data storage capacity of the electronic device and avoid deleting data, limiting services, or purchasing additional external storage devices.

Many electronic devices use media drives to store data on disks, such as a hard-disk drive. Generally, the data of each disk is organized along concentric tracks of magnetic media in which bits of the data are written. Typically, the data of a device is grouped and written sequentially in blocks to respective physical sections of the magnetic media tracks. The magnetic media on a surface the disk, however, is often not uniform, such that quality of the magnetic media may vary substantially around the surface of the disk or between media surfaces. Additionally, when neighboring tracks of media are repeatedly written (e.g., hundreds of times) without refreshing a track of interest, interference from writing the neighboring tracks may cause adjacent track erasure across substantial portions of the track. Due to these variations and degradation, readback of the data from linear sections of the magnetic media has a non-uniform signal-to-noise ratio (SNR). As such, data of the media drive may be lost when blocks of data are written to sections of poor-quality media or to sections that become degraded (e.g., due to a write head drifting off-track from a neighboring track), which may result in low SNR read signals or readback failure.

SUMMARY

This summary is provided to introduce subject matter that is further described in the Detailed Description and Drawings. Accordingly, this Summary should not be considered to describe essential features nor used to limit the scope of the claimed subject matter.

In various aspects, segments of a codeword are spread or interleaved across multiple surfaces (e.g., platter surfaces) of magnetic storage media. Data for one or more codewords may be received by a read/write channel and, for each codeword, a respective index (e.g., indicator) is selected, received, or generated. The index may include an indication or mapping that indicates onto which surfaces of the multiple surfaces that segments of one of the codewords are to be written. For example, an interleaving index may indicate a pattern for writing codeword segments into sectors spread across multiple media surfaces. The data of the codewords is then segmented and placed in an interleaver based on the respective indices or indicators to which the codewords correspond. The segments of codewords are written from the interleaver to respective sectors (or sector partitions) of the multiple surfaces of the magnetic media. By so doing, codewords may be spread across multiple media surfaces, such that degradation of a magnetic media track does not prevent readback and decoding of the codewords.

In aspects described herein, an apparatus that includes an interleaver, a system-on-chip that includes an interleaver, and/or methods may implement codeword interleaving over magnetic media surfaces. In various implementations, an interleaver or a method may receive data to be written to magnetic media surfaces and encode the data to provide one or more codewords of encoded data. For each of the one or more codewords, a respective index is determined that indicates which of the magnetic media surfaces that segments of the codewords are to be written and the segments of the one or more codewords are placed into an interleaver based on the respective index that corresponds to the codeword. The segments of the one or more codewords are then written from the interleaver to sector partitions of at least two of the magnetic media surfaces to interleave the segments of the one or more codewords over the magnetic media surfaces.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of codeword interleaving over magnetic media surfaces are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
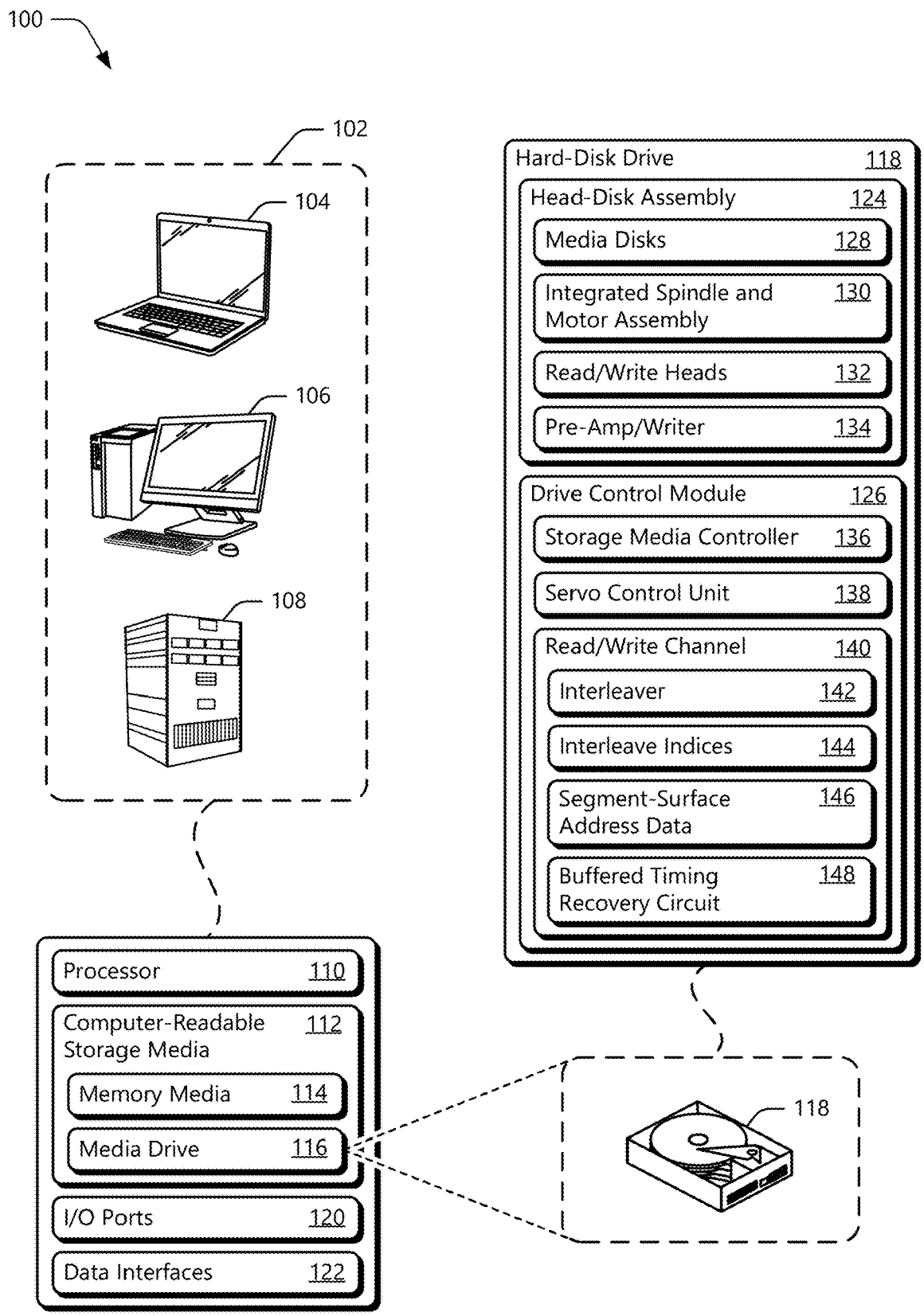
FIG. 1 illustrates an example operating environment having devices in which codeword interleaving over magnetic media surfaces may be implemented.

Preceding techniques for writing data to magnetic media of a disk write blocks of data to respective physical sections of magnetic media track. Generally, the data of each disk is organized along concentric tracks of magnetic media in which blocks of data are written. Typically, the data is grouped and written sequentially such that each of the data blocks is written to a next portion of the magnetic media tracks. In other words, one block of data is written to one section of the magnetic media track. The magnetic media on a surface the disk, however, is often not uniform, such that the quality of the magnetic media may vary substantially around the surface of the disk. Additionally, write activity on neighboring tracks may cause degradation of various portions or lengths of magnetic media tracks. In some cases, write head drift from the neighboring track may cause overwriting or interference with sectors of a track of interest. In other cases, neighboring tracks of the media are repeatedly written (e.g., hundreds of times) without refreshing the track of interest, and the interference from writing the neighboring tracks may cause adjacent track degradation across substantial portions of the track. This more uniform degradation of tracks is commonly known as adjacent track erasure (ATE) or adjacent track interference (ATI) and may degrade longer portions of a track. Due to these variations and degradation, readback of the data from the magnetic media has a non-uniform signal-to-noise ratio (SNR) and may further suffer from degraded signal quality as neighboring tracks are utilized more. As such, data of the media drive may be lost when blocks of data written to sections of poor-quality media or to sections or tracks that become degraded, which may result in low SNR read signals or readback failure.

This disclosure describes apparatuses and techniques of codeword interleaving over magnetic media surfaces. In contrast with preceding data writing techniques, the described apparatuses and techniques may write segments (or portions) of a codeword across multiple surfaces (e.g., disk surfaces) of magnetic storage media. Generally, a plurality of sectors of respective media tracks or recording tracks of multiple magnetic media surfaces are grouped or assigned as an interleaver group. These sectors of the interleaver group may be divided into or include partitions for storing segments of codewords, rather than entire codewords or sectors of user data. In some aspects, data for one or more codewords of the interleaver group is received, such as by a read/write channel of the magnetic storage media. Respective indices (or indicators) for the codewords may also be received that indicate within which partitions of the plurality sectors across the media surfaces that segments of codewords are to be written. In some cases, the data is encoded to provide the one or more codewords of encoded data, which can then be segmented.

The segments of the one or more codewords are then placed in an interleaver (e.g., a buffer) based on the respective index (or indicator) to which the codeword corresponds. Thus, a read/write channel may have a set of indices, which each indicates a pattern or mapping by which to spread the codeword segments across multiple sector partitions of the media surfaces. The segments of codewords then are written from the interleaver to partitions of the respective sectors of the multiple media surfaces to interleave the segments of the codewords across the multiple media surfaces of the interleaver group. As such, if one or two codeword segments are written to poor quality sectors or to sectors of track that becomes degraded (e.g., due ATI or ATE), other codeword segments from tracks of the other surface can be used to recover and decode the original data of the codeword, without using the codeword segments lost in the bad or degraded sectors.

The described aspects of codeword interleaving over magnetic media surfaces may provide several advantages over preceding techniques that write data to continuous tracks of storage media. For example, by interleaving codeword segments across multiple segments of a single data track, codewords may be read or recovered despite low SNR read signals associated with localized errors or non-uniform media. Interleaving codewords over only one track, however, may introduce data access inefficiencies or fail to compensate for more severe forms of degradation. Specifically, limiting the interleaving of codeword segments over one continuous media track may slow read or write operations, which in turn decreases a number of input/output operations (IOPs) that a disk controller can complete in a given amount of time. Additionally, writing media tracks in a continuous manner, whether in interleaved or sequential fashion, can result in strong degradation as individual tracks are heavily rewritten (e.g., written hundreds of times). As such, codeword segments interleaved over a single track adjacent to other heavily used tracks may all be degraded due to ATE or ATI of neighboring tracks. Thus, the continuous writing of interleaved codewords to single tracks of media may decrease controller performance and result in other types of degradation that limit or counter the benefit of single-track interleaving.

As described herein, codeword interleaving over magnetic media surfaces may address these issues and provide other benefits. In aspects, an interleaver of a read/write channel can interleave codeword segments across media recording surfaces to reduce the likelihood that significant ATE or ATI is observed for an entire sector of user data. Additionally, by interleaving over two or more media surfaces, interleaving overhead of a single write head can be reduced, enabling a disk controller to maintain IOPs throughput while maintaining SNR or other gains provided by interleaving codeword segments. In various aspects, a read/write controller with an interleaver can write data of codewords in parallel, such that two or more segments of data from a sector (e.g., user data sector) are written on two or more surfaces concurrently. Alternatively, the interleaver can write data in series, such that a first codeword segment of a sector is written to a first media surface, and then a second codeword segment of the data is written to a second surface. Writing in series across multiple media surfaces has the benefit that only one driver for a write head may be needed, and any mechanical disturbance that affects all read/write heads will only affect one codeword segment at a given time.

In some implementations, the interleaver of a read/write channel may be configured to interleave data over multiple surfaces of a disk drive with different interleaving (e.g., patterns or indices) as a function of odd track or even track. For example, data for even numbered tracks can be written only on a first surface (e.g., surface 1 or surface 2), with data for odd numbered tracks being written alternately on the first surface and a second surface (e.g., surface 1 and surface 2, surface 2 and surface 3, etc.). Thus, data of one logical block may be written on two different surfaces, in same sectors or offset sectors depending on interleave index, interleaver configuration, drive actuator configuration, and so forth. By so doing, interference due to continuous track writing can be reduced between the even and odd tracks, further improving data reliability. To ensure smooth transitions between writing media surfaces, the disk controller may concurrently maintain servo lock to the two media surfaces. By aligning and/or tracking respective servo wedges of the two media surfaces between which the interleaver alternates, it can be fairly straightforward to alternate the writing and reading operations between the two media surfaces utilizing only one write channel and one read channel, while the servo channel may serve signals from the two media surfaces at the same time. These are but a few example implementations of codeword interleaving over multiple magnetic media surfaces, others of which are described throughout the disclosure.

In various aspects, segments of a codeword are spread or interleaved across multiple surfaces (e.g., platter surfaces) of magnetic storage media. Data for one or more codewords may be received by a read/write channel and, for each codeword, a respective index (e.g., indicator) is selected, received, or generated. The index may include an indication or mapping that indicates onto which surfaces of the multiple surfaces that segments of one of the codewords are to be written. For example, an interleaving index may indicate a pattern for writing codeword segments into sectors spread across multiple media surfaces. The data of the codewords is then segmented and placed in an interleaver based on the respective indices or indicators to which the codewords correspond. The segments of codewords are written from the interleaver to respective sectors (or sector partitions) of the multiple surfaces of the magnetic storage media. By so doing, codewords may be spread across multiple media surfaces, such that degradation of a magnetic media track does not prevent readback and decoding of the codewords.

The following discussion describes an operating environment, techniques that may be employed in the operating environment, and a System on Chip (SoC) in which components of the operating environment can be embodied. In the context of the present disclosure, reference is made to the operating environment by way of example only.

Operating Environment

FIG. 1 illustrates an example operating environment 100 having a computing device 102 (e.g., host device), capable of storing to or accessing data from various storage devices, such as a magnetic media-based drive. In aspects, devices of the operating environment 100 may implement codeword interleaving over magnetic media surfaces when implementing data access operations, which are described throughout this disclosure. Examples of a computing device 102 may include a laptop computer 104, desktop computer 106, and server 108, any of which may be configured as part of a storage network or cloud storage. Further examples of a computing device 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the computing device 102 may provide, communicate, or store data for any suitable purpose, such as to enable functionalities of a particular type of device, provide a user interface, enable network access, implement gaming applications, playback media, provide navigation, edit content, provide data storage, or the like. Alternatively or additionally, the computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes a processor 110 and computer-readable storage media 112, in an embodiment. The processor 110 may be implemented as any suitable type or number of processors, either single-core or multi-core (e.g., ARM or x86 processor cores), for executing instructions or commands of an operating system or other programs of the computing device 102. The computer-readable storage media 112 (CRM 112) includes memory media 114 and a media drive 116. The memory media or system memory of the computing device 102 may include any suitable type or combination of volatile memory or nonvolatile memory. For example, volatile memory of the computing device 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications and/or an operating system of computing device 102.

The media drive 116 of the computing device 102 may include one or more media drives or be implemented as part of a data storage system with which the computing device 102 is associated. In this example, the media drive 116 includes a hard-disk drive 118 (HDD 118), which is capable of storing data and is described with reference to various aspects of codeword interleaving. Alternatively or additionally, the media drive 116 may be configured as any suitable type of data storage drive or system, such as a storage device, storage drive, storage array, storage volume, or the like. Although described with reference to the computing device 102, the media drive 116 may also be implemented separately as a standalone device (e.g., external hard drive) or as part of a larger storage collective, such as a data center, server farm, or virtualized storage system (e.g., for cloud-based storage or services) in which aspects of codeword interleaving over magnetic media surfaces are implemented.

The computing device 102 may also include I/O ports 120, a graphics processing unit (GPU, not shown), and data interfaces 122. Generally, the I/O ports 120 allow a computing device 102 to interact with other devices, peripherals, or users. For example, the I/O ports 120 may include or be coupled with a universal serial bus, human interface devices, audio inputs, audio outputs, or the like. The GPU may be utilized as a computational device, which may include machine learning or other similar applications. The GPU may also process and render graphics-related data for computing device 102, such as user interface elements of an operating system, applications, or the like. In some cases, the GPU accesses a portion of local memory to render graphics or includes dedicated memory for rendering graphics (e.g., video RAM) of the computing device 102.

The data interfaces 122 of the computing device 102 provide connectivity to one or more networks and other devices connected to those networks. The data interfaces 122 may include wired interfaces, such as Ethernet or fiber optic interfaces for data communicated over a local network, intranet, or the Internet. Alternatively or additionally, the data interfaces 122 may include wireless interfaces that facilitate communication over wireless networks, such as wireless LANs, wide-area wireless networks (e.g., cellular networks), and/or wireless personal-area-networks (WPANs). Any of the data communicated through the I/O ports 120 or the data interfaces 122 may be written to or read from the storage system of the computing device 102 in accordance with one or more aspects of codeword interleaving over magnetic media surfaces.

Returning to the media drive 116, the computing device 102 may include the hard-disk drive 118 as shown and/or other types of storage media on which codeword interleaving may be implemented. Although not shown, other configurations of the media drive 116 are also contemplated, such as a solid-state drive (SSD), a magnetic tape drive, optical media drives, HDD/SSD hybrid drives, and other storage systems that write data to storage media (e.g., magnetic or optical storage media). Alternatively or additionally, the computing device 102 may include an array of media drives or serve as a media drive aggregation device or host for multiple media drives in which aspects of codeword interleaving may be implemented.

In this example, the disk drive 118 includes a head-disk assembly 124 (HDA 124) and drive control module 126 to implement or enable functionalities of the hard-disk drive 118. In some cases, the drive control module 126 is implemented as a printed circuit board assembly (PCBA) with semiconductor devices, logic, or other circuitry. The HDA 124 includes one or more media disks 128 mounted on an integrated spindle and motor assembly 130. The spindle and motor assembly 130 may rotate the media disk 128 under (or over) read/write heads 132 coupled with a head assembly (not shown) of the HDA 124. The media disks 128 may be coated with a magnetically hard material (e.g., a particulate surface or a thin-film surface) and may be written to, or read from, a single side or both sides.

The read/write heads 132 may be operably coupled with a pre-amplifier/writer module 134 (pre-amp/writer 134) of the HDA 124 that includes pre-amplifier circuitry for amplifying write signals or read signals of the read/write heads 132. The pre-amp/writer 134 may receive or store head selection, amplification, or sense current values useful for writing data to, or reading data from, the magnetic media 202. The read/write heads 132 and/or pre-amp/writer 134 may be configured to function in concert or coordination with other components of the hard-disk drive 118 to implement aspects of codeword interleaving.

As shown in FIG. 1, the example drive control module 126 of the hard-disk drive 118 includes a storage media controller 136, a servo control unit 138, and a read/write channel 140 (R/W channel 140). Generally, the storage media controller 136 enables the computing device 102 to access contents of magnetic storage media of the media drive 116, such as an operating system, applications, or data for applications or other services. The storage media controller 136 may also write and read data of the computing device 102 to and from the magnetic storage media of the media drive 116. In some cases, the drive control module 126 directs or uses the servo control unit 138 to control mechanical operations, such as read/write head 132 positioning through the HDA 124 and rotational speed control through the spindle and motor assembly 130.

The read/write channel 140 may include digital-to-analog and analog-to-digital paths for converting write data to a write signals or converting read signals to read data, respectively. For example, the read/write channel 140 may process and encode signals when data, such as sectors of user data, are written to media surfaces of the media disk 128 as segments of codewords. Alternatively or additionally, the read/write channel 140 may process and decode signals when encoded data, such as codeword segments, are read from multiple sectors of the media disk 128. This signal processing, encoding, and/or decoding of the write signals or read signals may include signal conditioning, sampling, equalization, phase adjustment, detection, error-correction, or the like. How the read/write channel 140 is implemented and used varies and is described throughout this disclosure. The drive control module 126 or components thereof may be implemented as one or more IC chips, a System-on-Chip, a System-in-Package, or a microprocessor provided with or implementing a hard-disk-drive controller. The drive control module 126 may also include drive electronics (not shown) and/or include various interfaces, such as a host-bus interface, storage media interface, spindle interface, or a pre-amp/writer interface.

In some aspects, the read/write channel 140 includes a sector interleaver 142 (interleaver 142), interleave indices 144, segment-surface address data 146, and a buffered timing recovery circuit 148. The interleaver 142 enables segmenting or dividing of user data or codewords to provide codeword segments, which may be interleaved or written across multiple surfaces of magnetic storage media. In some cases, respective sectors of the surfaces of magnetic storage media are partitioned into sector partitions in which the segments of the codewords are written. Alternatively or additionally, the interleaver 142 may also read segments of codewords from respective partitions of a plurality of sectors of the media surfaces. The interleaver 142 may aggregate the segments of the codewords for subsequent decoding to provide user data.

The interleave indices 144 may indicate how to interleave respective segments of codewords over or across multiple media surfaces, such as disk surfaces or platter surfaces of the HDD 118. In some cases, the interleave indices 144 are used to load, place, or organize codeword segments into the interleaver 142 or an interleave buffer. In other cases, the interleave indices 144 are useful to mask or block a read gate to selectively read codeword segments from corresponding sector partitions of multiple media surfaces. In aspects, the R/W channel 140 or storage media controller 136 generates and/or maintains the segment-surface address data 146 to enable reading of codeword segments from the multiple media surfaces of the HDD 118. For example, the storage media controller 136 may associate, in the segment-surface address data, logical block addresses (LBAs) of user data with a respective interleave indices to record or track locations of codeword segments of a codeword that are interleaved across sectors or sector partitions of multiple media surfaces. Thus, in some aspects, the segment-surface address data 146 may be implemented as a lookup table that supplements or extends an LBA table or database enabling access (e.g., read or write) of codeword segments that are interleaved over multiple media surfaces.

The buffered timing recovery circuit 148 may enable reading and decoding of codeword segments through timing interpolation to adjust a phase of data samples read back from the sectors of the media track. Due to the reduced size of the codeword segments, a short synchronization mark (e.g., sub-sector sync mark) may be used to indicate a start or position of a codeword segment within a physical segment of magnetic storage media. In some cases, buffering read back data samples while a phase of a synchronization sequence or preamble is determined allows the use of a short (e.g., less than 40 to 50 bit clocks) synchronization mark in the codeword segments. How the interleaver 142, interleave indices 144, segment-surface address data 146, and buffered timing recovery circuit 148 are implemented and used varies and is described throughout this disclosure.

Figure 2:
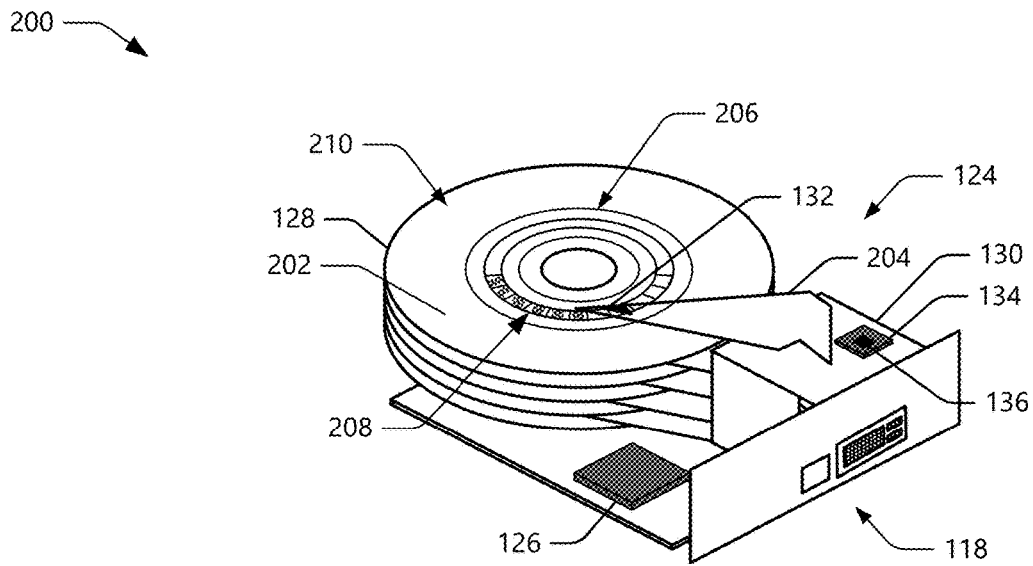
FIG. 2 illustrates an example configuration of the hard-disk drive in accordance with one or more aspects.
Figure 2:
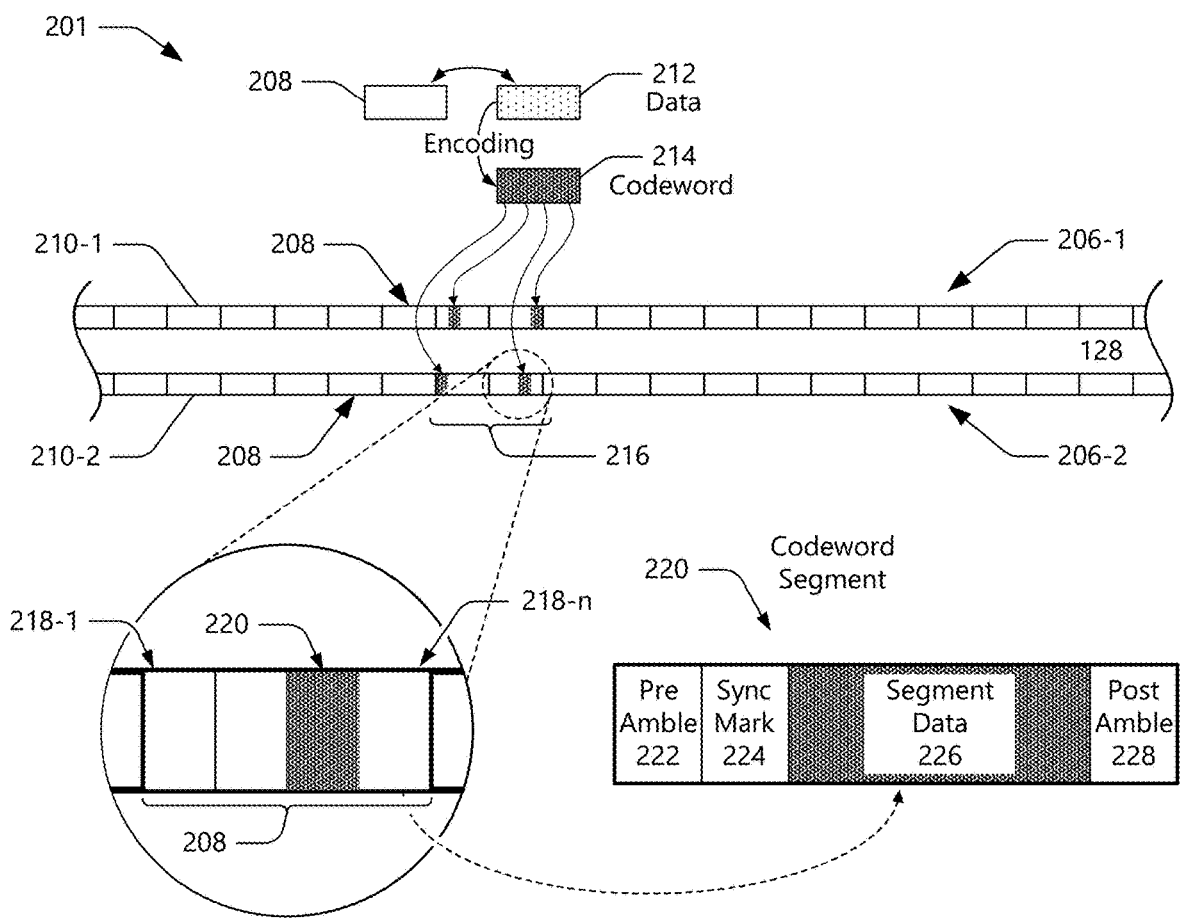

FIG. 2 illustrates at 200 an example configuration of the hard-disk drive 118 implemented in accordance with various aspects. As shown in FIG. 2, the HDA 124 of the hard-disk drive 118 (e.g., HDD of FIG. 1) includes an integrated spindle and motor assembly 130 by which media disks 128 of magnetic media 202 are supported and/or operated, in an embodiment. An actuator arm 204 (actuator 204) may maneuver, and thus position a read/write head 132 (or multiple read/write heads 132) over a desired track 206 of sectors 208 located or arranged on a magnetic media surface (media surface 210) of the magnetic media 202 of the media disk 128. In some implementations, the actuator 204 may be implemented as a dual stage or triple stage actuator that enables positioning over multiple tracks when a first stage of the actuator is in one position (e.g., over five to seven tracks independent of actuator stack position). Thus, the actuators 204 may position multiple read/write head 132 in relation to respective tracks of sectors on multiple media surfaces to enable parallel writing or parallel reading of codeword segments.

Generally, the read/write head 132 may include various numbers of head elements with combined or separate functions (e.g., dedicated R/W functions). For example, the read/write head 132 may include one or more readers (read heads/elements) and one writer (write head/element). In other cases, the read/write head 132 may include a dedicated write head (element) and one or more separate, additional dedicated read heads (elements). Alternatively or additionally, although multiple actuators 204 are shown in FIG. 2, the HDA 124 or spindle and motor assembly may be implemented with a single actuator 204 or other suitable structures for positioning the read/write head 132. With respect to configurations of an actuator, an actuator generally includes arms and each arm holds or supports two sliders (e.g., read/write head assemblies) at a tip of the arm. For example, an actuator for a single platter drive with only one magnetic surface would have one actuator arm configured with one slider proximate the one magnetic surface. For single platter with two magnetic surfaces, an actuator stack may include two actuator arms, each with single slider over a respective one of the magnetic surfaces of the platter. Further, for two platters with two magnetic surfaces, an actuator assembly can include three arms, with the top actuator and bottom actuator configured with a single slider and the middle actuator configured with two sliders.

Generally, for n number of platters, an actuator stack can be configured with n+1 actuator arms, with the top actuator arm and bottom actuator arm being configured with one slider and the intermediate actuator arms (e.g., actuator arms between platters) configured with two sliders. In aspects, an actuator may be configured as a dual actuator or multi-actuator that includes two or more actuators, with each controlling one or more actuator arms (e.g., as part of an actuator stack or assembly). A dual stage or triple stage actuator may include multiple stages of actuation for positioning a tip (e.g., read head or write head). Thus, a dual stage, triple stage, or multi-stage actuator may be configured with two, three, or more actuators (e.g., on an actuator arm) at various positions out toward the tip of the actuator arm. Because these stages need to move only the slider (read head or write head), or even part of the slider, over a track or sector of interest, the multi-stage actuators can move much faster compared to a heavier main actuator, which typically includes several arms. The HDA 124 and the drive control module 126 may be implemented separately, on separate substrates, and/or as separate PCBAs of a media drive. Signals or data communicated between the HDA 124 and the drive control module 126 may be carried through a flexible printed cable or other suitable connective structures, such as traces, connectors, bond wires, solder balls, or the like.

FIG. 2 also includes an illustration of example sectors 208 on multiple media surfaces 210-1 and 210-2 configured to store codeword segments that are written to the magnetic media 202 of a media disk 128. One or more of the read/write heads 132 may write user data or codewords to respective sectors 208 of the tracks 206 of a media disk 128 (e.g., a sector of track 206). As described herein, the write heads 132 may write codeword segments serially to different media surfaces 210 or in parallel to multiple media surfaces 210. For illustrative purposes, a media disk 128 is shown to include tracks 206-1 and 206-2 located on respective top media surface 210-1 and bottom media surface 210-2 of the media disk 128. In this example, the media surfaces 210 are shown after codeword segments have been written to sectors 208 by a read/write head 132. Generally, during write operations, the read/write head 132 may be driven by a write current provided by the pre-amp/writer 134, whereby an electrical signal is used to generate and/or transfer magnetic fields having associated polarities of encoded bits to the media disk 128. In response to application of the magnetic fields or write fields, the read/write head 132 may form a plurality of magnets in magnetic grains of the sectors 208 of the media surface 210 that correspond to the encoded codewords of data (e.g., user data). The HDA 124 of the hard-disk drive 118 may be configured to perform write operations in accordance with any suitable recording technology, such as perpendicular magnetic recording (PMR), shingled magnetic recording (SMR), heat-assisted magnetic recording (HAMR), microwave assisted magnetic recording (MAMR), or the like.

As shown at 201, a sector of data 212 may generally correspond to a sector 208 of magnetic media 202. In aspects of codeword interleaving, the sector of data 212 is encoded to provide a codeword 214 of encoded data. In some cases, the data is encoded by the read/write channel 140 with an error correction coding (ECC) to provide codewords that reduce errors in data storage and transmission by introducing data redundancy into a data channel, such as in the form of extra bits that useful to verify the validity of the original data. Examples of error correcting codes employed by the read/write channel 140 or interleaver 142 include Reed-Solomon (RS), Bose, Ray-Chaudhuri, Hocquenghem (BCH), low-density parity-check (LDPC), Turbo codes, polar codes, linear block codes, or any other suitable error correcting code. Generally, the encoding of the data of the codeword may enable reconstruction or decoding of a codeword from fewer than all of the encoded segments of the codeword. Thus, interleaving the codeword segments across multiple media surfaces can improve reliability of data stored to the magnetic media of the HDD 118, particularly when one or more sectors are overwritten due to head drift or portions of a track are degraded by ATI or ATE.

In this example, the codeword 214 is split or divided into four segments of the codeword, which may also be referred to as codeword segments. In various implementations, the interleaver 142 may segment or divide a codeword of encoded data into any suitable number or range of segments, which may include two segments per codeword, three segments per codeword, four segments per codeword, six segments per codeword, eight segments per codeword, 16 segments per codeword, 32 segments per codeword, 64 segments per codeword, and so forth. In some aspects, the interleaver 142 may increase or decrease a number of segments into which encoded data of a codeword is divided based on a SNR of the magnetic media, known sector/track quality metrics, or the like. Here, assume that a storage media controller 136 has assigned 4 sectors 208 of media tracks 206-1 and 206-2 to an interleaver group 216, or a plurality of respective tracks and sectors on multiple media surfaces over which segments of one or more codewords are spread. Alternatively or additionally, each sector 208 may be divided or partitioned into any suitable number of partitions 218-1 through 218-$n$, where n is any suitable integer. As shown in FIG. 2, the codeword 214 is divided into segments 220 (codeword segments 220), which are written across the four sectors of the interleaver group 216. Although illustrated as being written to consecutive or contiguous sectors 208 across the media surfaces 210-1 and 210-2, the codeword segments may also be written in parallel to sectors 208 of different media surfaces or to non-consecutive or non-contiguous sectors 208, such as to spread the codeword across a greater number of sectors 208 across a media surface 210.

In some aspects, a codeword segment 220 includes a pre-amble 222 (e.g., a sub-sector preamble), synchronization mark 224 (sync mark 224, sub-sector synchronization mark), segment data 226 (e.g., encoded user data), and a post-amble 228. Because codewords may be segmented into segments smaller than sectors of storage media, the interleaver 142 may implement sub-sector markings or indicators to enable readback of the codeword segments. Thus, codeword segments interleaved over or across multiple media surfaces may include unique or sequential indicators (e.g., sub-sector indicators) that enable identification and readback of data samples that correspond to the codeword segments.

To conserve or reduce access overhead, the codeword segment 220 may be implemented with a pre-amble 222 and sync mark 224 configured for use with a buffered timing recovery circuit 148. In aspects, the use of the buffered timing circuitry may improve the timing adjustment and/or reconstruction of a codeword from multiple codeword segments read from multiple respective media surfaces. Generally, this may enable the use of a shorter synchronization sequence in the pre-amble 222 and sync mark 224 through the buffering of data samples while at least a portion of phase computation is performed for the synchronization sequence. By so doing, a phase of the buffered data samples may be adjusted for sync mark identification after the phase is determined (e.g., in parallel), rather than delaying a read of a sync mark until after phase is determined while reading a synchronization sequence. In some cases, this enables the codeword segments 220 to be implemented with a synchronization sequence that is shorter (e.g., less than 40 to 50 bit clocks) than those used for conventional codeword writing (e.g., approximately 100 bit clocks in length).

Figure 3:
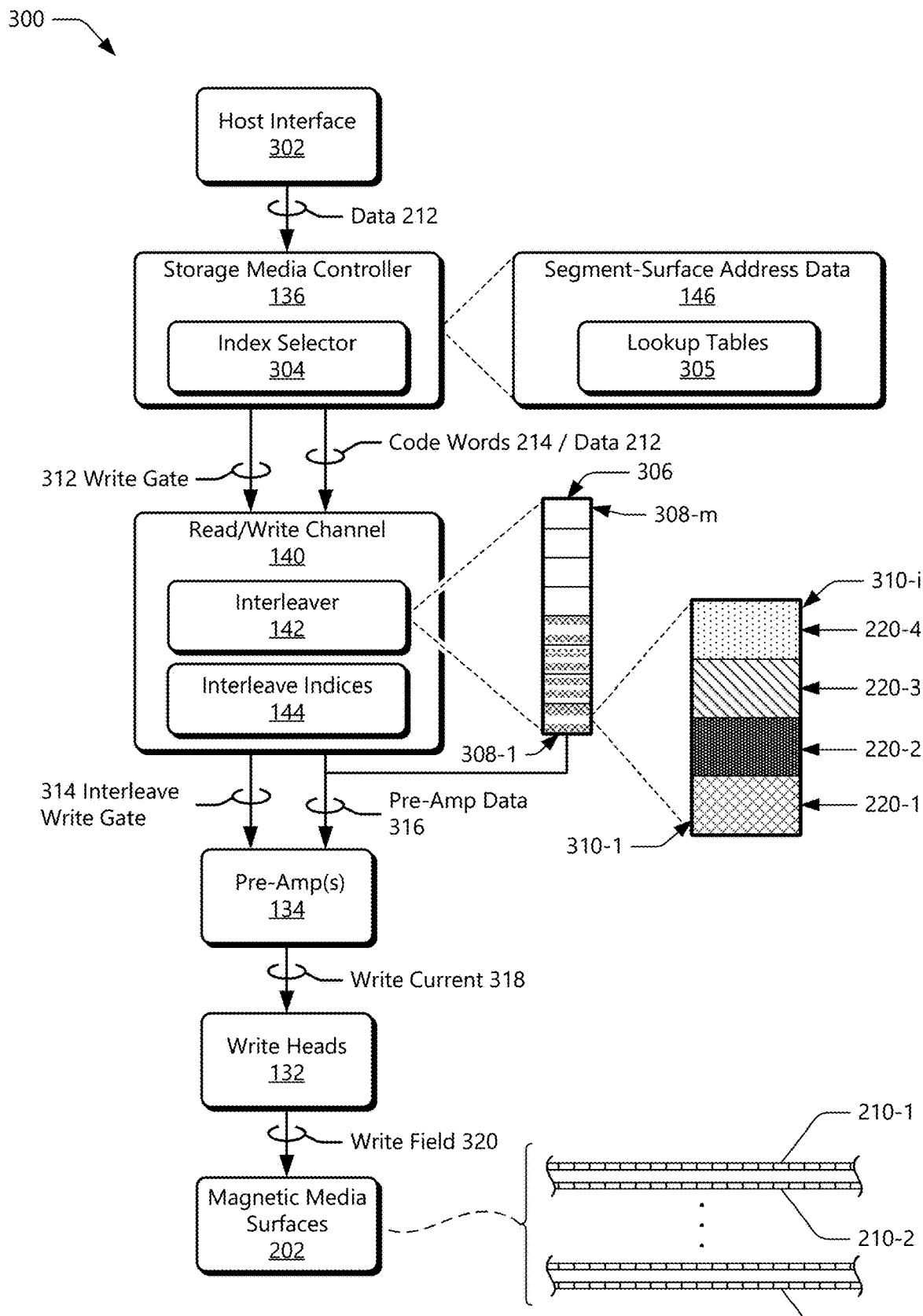
FIG. 3 illustrates example configurations of a read/write channel and interleaver that may implement aspects for writing interleaved codewords over magnetic media surfaces.

FIG. 3 illustrates example configurations of a read/write channel and interleaver generally at 300, which may organize and write codeword segments in accordance with various aspects of codeword interleaving over magnetic media surfaces. In this example, the interleaver 142 is operably coupled with the read/write channel 140, which also includes an instance of interleave indices 144. Although shown in FIG. 3 as separate components or circuitry, the interleaver 142 and interleave indices 144 may be integrated as one component, separated among other components of the hard-disk drive 118, and/or integrated with other microelectronics or circuitry of the read/write channel 140 or storage media controller 136. For example, in some aspects, the storage media controller 136 may include the interleaver 142 and interleave segments of codewords for writing over or across multiple media surfaces.

As shown in FIG. 3, a host interface 302 may provide data 212 (e.g., user data) or other information to the storage media controller 136 for writing to the magnetic media 202 of an HDD 118. In some aspects, the storage media controller 136 or the interleaver 142 assigns respective sets of physical media sectors 208 on multiple media surfaces 210 on which to write one or more interleaved codewords 214. For example, the storage media controller 136 can assign or group 16 to 64 consecutive sectors 208 of same tracks or different tracks on at least two different media surfaces 210 for writing 16 to 64 interleaved codewords 214. The storage media controller 136 may provide data 212 to the read/write channel 140 for one or more of the codewords for writing to the tracks of sectors 208 on the media surfaces 210, such as in various patterns or based on indices as described herein. As described herein, data 212 for a codeword 214 may also be referred to as a sector of user data. Alternatively or additionally, the storage media controller 136 may encode the data 212 and provide the codewords 214 to the read/write channel 140.

In some aspects, the storage media controller 136 also provides information regarding which codeword interleaves or patterns are to be used to interleave and write the codeword segments 220 to the sectors 208 of the multiple media surfaces 210. For example, when 16 sectors are assigned or configured as an interleaver group or interleaver area, if four interleaved codewords 214 are sent to the read/write channel 140, the storage media controller 136 may provide this information to the interleaver 142 as how to interleave segments of the four codewords 214 to or across the 16 sectors 208 of the media surfaces 210. This information may include interleave indices 144 or indicators, which specify how a codeword 214 is interleaved or patterned among the sectors 208 of an interleaver group or area across multiple media surfaces. The interleave indices 144 may include pre-defined indices or indicators, which may be known to one or both of the storage media controller 136 or read/write channel 140, such that an interleave index 144 may be referenced by a unique index identifier (e.g., 0, 1, . . . 14, 15). In this example, the storage media controller 136 includes an interleave index selector 304 (index selector 304), which may be configured to select a respective interleave index 144 for a codeword 214 sent to the read/write channel 140.

The storage media controller 136 may also include or have access to segment-surface address data 146, which provides a mapping of codeword segments 214 across the respective sectors of multiple media surfaces 210-1 through 210-x, where x is any suitable integer. In this example, the segment-surface address data 146 may include address data in the form of lookup tables 305 that enable addressing operations for writing and/or readback of the codeword segments from the media surfaces. In some cases, the lookup tables 305 correspond with or are an extension of LBA data for the user data written to the media drive 116 or HDD 118. In the context of the present example, the index selector 304 would select a different interleave index for each codeword 214 (e.g., four codeword segments) to be interleaved and written to the 16 sectors 208 of the interleaver group that includes surface 210-1 and 210-2 of a media disk.

Generally, the read/write channel 140 may receive a sector of data 212, encode the data 212 as a codeword 214, and provide the codeword 214 to the interleaver 142. In this example, the interleaver 142 includes a configurable interleave buffer 306 into which segments of the codewords 214 are placed by the interleaver 142 based on a respective interleave index 144 that corresponds to the codeword. Thus, depending on a respective interleave index 144 assigned to each codeword, the interleaver 142 may sort or organize the codeword segments in the interleave buffer 306 to enable the writing of the codeword segments by one or more write heads to the appropriate media surfaces 210. Although illustrated here as a buffer, the interleaver 142 may include any suitable data structure to receive interleaved codeword segments 220 placed by the interleaver 142 for writing to respective sectors of an interleaver group.

The interleave buffer 306 may be divided or include any suitable number of sections 308-1 through 308-m, where m is any suitable integer. In this example, the interleave buffer 306 includes eight sections, which may correspond to eight codewords or eight sectors of media track. In other words, the interleaver 142 or interleave buffer 306 may be configured based on a size of an interleaver group (e.g., assigned sectors) or a number of codewords to be written to the interleaver group and across the multiple media surfaces. Alternatively or additionally, each section 308 of the interleave buffer 306 may be divided into or include partitions 310-1 through 310-i, where i is any suitable integer. In some cases, the number of partitions 310 of a section 308 corresponds to a number of slots or partitions (e.g., sector partitions) that one or more sectors 208 of the interleaver group includes. In this example, the sections 308 of the interleave buffer 306 may each include four partitions 310 to buffer or store four codeword segments 220.

By way of example, assume that the storage media controller 136 provided data 212 for four codewords 214 and four respective interleave indices 144 for each of the codewords. In some aspects, the read/write channel 140 takes a first sector of data 212, encodes the data 212 to provide a first codeword 214, and the interleaver 142 places segments 220 of the first codeword 214 into the interleave buffer 306 based on a first interleave index 144 (e.g., writing an odd track of media surface 210-1). The read/write channel 140 may then take a second sector of data 212, encode the data 212 to provide a second codeword 214, and the interleaver 142 places segments 220 of the second codeword 214 into the interleave buffer 306 based on a second interleave index 144 (e.g., write even tracks interleaved across media surface 210-1 and 210-2). The read/write channel 140 and interleaver 142 may repeat these operations for the third and fourth codewords 214 as well, to interleave segments of the four codewords in the interleave buffer 306. As shown in FIG. 3, a first section 308-1 of the interleave buffer 306 may include codeword segments 220-1 through 220-4, which are placed into partitions or slots of the section 308 based on the interleave indices 144. Thus, respective segments of the four codewords 214 may be placed into or across the four sections 308 of the interleave buffer 306 based on the interleave indices 144 received with the data 212 for the codewords 214.

In aspects, to write the codeword segments 220 from the interleaver 142, the storage media controller 136 may provide a write gate signal 312 (write gate 312 or write signal) to the read/write channel 140. The storage media controller 136 may provide a write gate 312 for each sector 208 of the respective tracks on the media surfaces 210, to indicate a start or position of the physical sector to the read/write channel 140. Alternatively or additionally, the read/write channel 140 or interleaver 142 may determine a location index for a codeword 214 for where the segments of the codeword are to be written to respective partitions of the sectors of the interleaver group. In some cases, the read/write channel 140 or interleaver 142 determines, based on the location index, that one of the segments of the codeword is to be written to one of the partitions of the sector and then writes the segment based on the write signal, the location index, and selected media surface. In other cases, the read/write channel 140 or interleaver 142 determines, based on the location index, that one of the segments of the codeword is not to be written to one of the partitions of the sector and blocks the write signal to prevent writing of the partition of the sector or media surface.

In some aspects, the read/write channel 140 may manage or block the write gate 312 provided by the storage media controller 136 to generate an interleave write gate signal 314 (interleave write gate 314) for the pre-amp(s)/writer(s) 134 (pre-amps 134) of the media drive. The read/write channel 140 or interleaver 142 may also provide, to the pre-amp 134, the codeword segments 220 from the interleave buffer 306 as pre-amp data 316, which may include a signal corresponding to data patterns of the codeword segments. In aspects, the pre-amp data 316 may be multiplexed between multiple pre-amps 134 and write heads 132 based on the interleave index to write the codeword segments to multiple media surfaces 210. Based on the interleave write gate 314 and pre-amp data 316, the pre-amp 134 generates or provides a write current 318 to the write head 132 of the media drive to write the interleaved codeword segments 220 to sectors 208 of the specified media surface 210.

The write current 318 generated by the pre-amp 134 may then be provided to a corresponding write head 132 for the magnetic media 202. Based on the write current 318, the write head 132 may selectively generate a magnet write field 320 to form magnets in the sectors 208 of tracks on the media surfaces 210 that correspond to interleaved codeword segments 220. Alternatively or additionally, the storage media controller 136 may control the write gate 312 or interleave write gate 314 for each codeword segment written to the media surfaces 210 of the HDD 118. To do so, the read/write channel 140 may provide information regarding a length of each codeword segment 220 to be written from the interleaver 142. As such, it may be advantageous to allow the read/write channel 140 to control the writing of the interleaved codeword segments 220 because the write process would not pause or delay when writing codeword segments 220 to consecutive partitions of a sector 208 of track 206 on a media surface 210.

In some aspects, the storage media controller 136 may provide one or more codewords that belong to a same interleaver group to the read/write channel 140. The storage media controller 136 may also provide, such as along with the codewords, an index for each codeword indicating where the codeword belongs in the interleaver group and/or how to interleave segments of the codewords with respective segments of other codewords in the interleaver group. For example, in an interleaver group of size 16 (sectors or codewords), each codeword provided by the storage media controller 136 to the read/write channel 140 may be given a unique index (e.g., 0, 1, . . . 14, 15) by the index selector 304 to indicate to the read/write channel 140 where (e.g., which interleave pattern) to populate the interleaver 142 with the codeword. The unique index may also be useful to the read/write channel 140 to generate a location index for where to write the segments of the codeword within one or more sectors of the interleaver group across different media surfaces 210.

Based on the interleave indices 144 (or unique index) provided by the index selector 304 for the codewords, the read/write channel 140 may place or insert the codewords into the interleaver 142. The storage media controller 136 may generate one or more write gates 312 for each physical sector 208 on a track of the appropriate media surface 210 within the interleaver group. In response to the write gate 312, the read/write channel 140 may determine, based on the location index, if a codeword segment is to be written to a partition of the sector. When there is no codeword segment to write on one surface, the read/write channel 140 may block the write gate 312 until a next sector partition to prevent overwriting of existing data in the sector. At a next sector partition, the read/write channel 140 checks again to see if there are any codeword segments to write on the track of the media surface. When there is a codeword to write to the partition of the sector, the read/write channel 140 may unblock the write gate 312 to write the codeword segment together with a pre-amble, synchronization mark, and/or post amble. The read/write channel 140 or interleaver 142 may continue processing the codeword segments in similar fashion until the writing of the interleaver group across multiple media surfaces 210 is complete.

Figure 4:
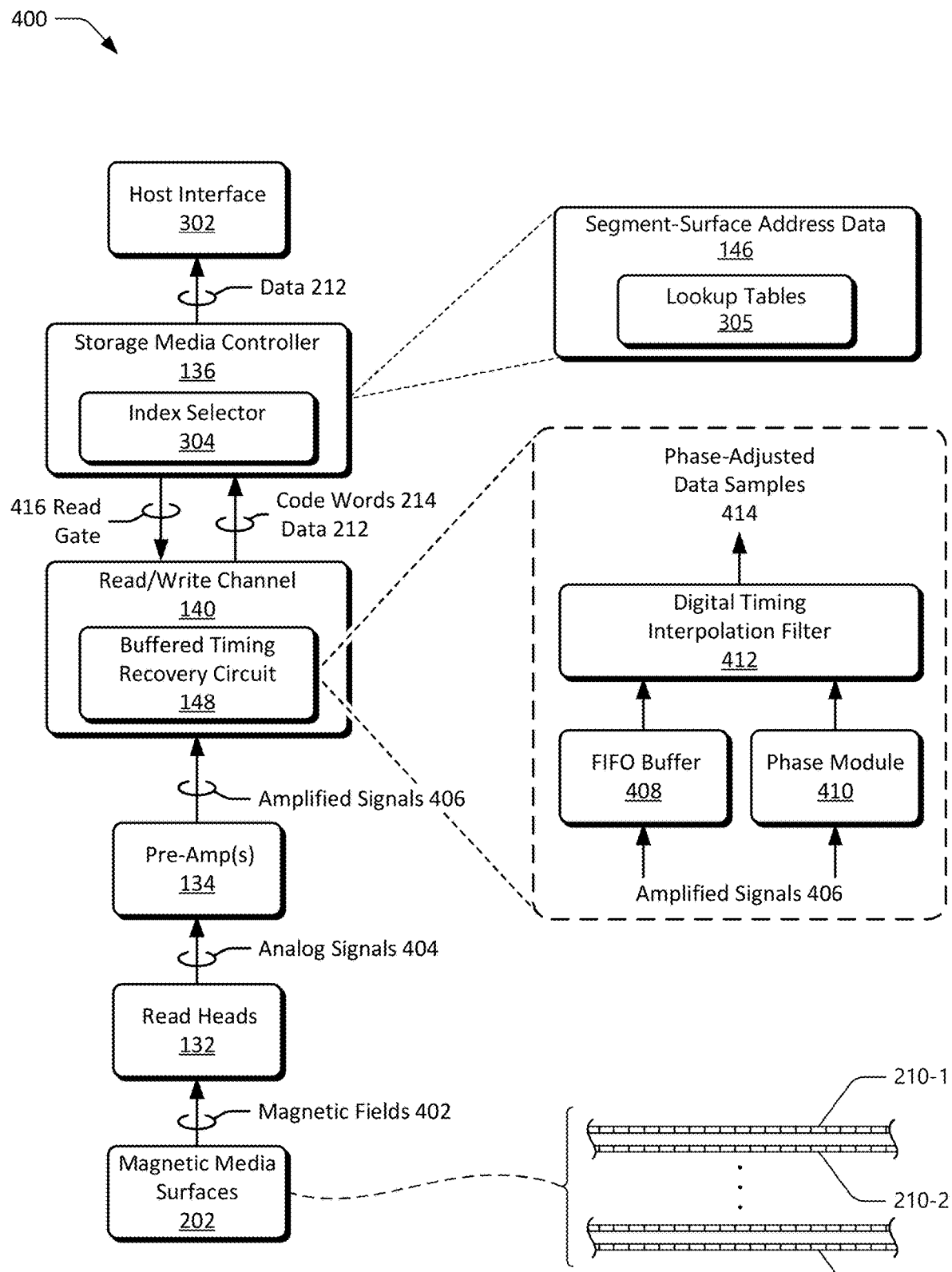
FIG. 4 illustrates example configurations of a read/write channel and timing recovery circuit that may implement aspects for reading interleaved codewords from magnetic media surfaces.

FIG. 4 illustrates example configurations of a read/write channel and timing recovery circuit generally at 400, which may read codeword segments in accordance with one or more aspects of codeword interleaving over magnetic media surfaces. In this example, an instance of a buffered timing recovery circuit 148 is operably coupled with the read/write channel 140 of a media storage drive. Although shown in FIG. 4 as separate components or circuitry, the read/write channel 140 and buffered timing recovery circuit 148 may be integrated as one component, separated among other components of the hard-disk drive 118, and/or integrated with other microelectronics or circuitry of the pre-amp 134, storage media controller 136, and/or the read/write channel 140.

In the context of FIG. 4, the read/write channel 140 and other components are described in the context of reading codeword segments 220 from across sectors of the magnetic storage media of multiple media surfaces 210-1 through 210-x. For example, a host system or computing device 102 may issue a read command for data stored as interleaved codeword segments that are spread across multiple surfaces 210-1, 210-2, through 210-x of respective media disks 128. Generally, as the media disks 128 rotate under the read head 132, the read head 132 senses magnetic fields 402 of codeword segments 220 stored on the multiple surfaces 210, which induce analog signals 404 at the read head 132. The pre-amplifiers 134 (pre-amps 134) amplify the analog signals 404 received from the read heads 132 and provide amplified signals 406 to the read/write channel 140.

In various aspects, the read/write channel 140 conditions and samples the amplified signals 406 (e.g., a read-back continuous time signal) provided by the pre-amps 134 to readback the codeword segments 220 from the multiple surfaces. To facilitate the reading of a codeword segment 220 independently from other codeword segments of a sector, each codeword segment 220 may include a synchronization sequence (e.g., sub-sector sync mark). By so doing, a readback circuit of the read/write channel 140 may identify a proper start of a codeword segment within a sector or partition of the sector. In some aspects, the buffered timing recovery circuit 148 is used by the read/write channel 140 to properly synchronize with the codeword segments from different media surfaces during readback.

In this example, the buffered timing recovery circuit 148 of the read/write channel 140 includes a first-in-first-out (FIFO) buffer 408, phase module 410, and digital timing interpolation filter 412. Generally, with the buffered timing recovery circuit 148 and digital timing recovery, which may also be referred to as interpolated timing recovery, data samples provided by amplified signals 406 of the read/write channel 140 may be buffered in the FIFO buffer 408 at least partially in parallel with computation of a phase for a synchronization sequence by the phase module 410 based on a read signal (e.g., amplified signals 406). In some aspects, data or codeword segments on the media disks are written as a preamble followed by an address mark and then encoded user data. The preamble, address mark, and encoded user data may be received by the read/write channel as the amplified signals 406. The phase module 410 may use the pre-amble part of the read signal to calculate a phase offset to initialize a correct phase in the digital timing interpolation filter. While the phase module calculates the phase, the remaining read signals may be buffered into the FIFO buffer 408. When the phase is calculated, the data in the FIFO buffer 408 then passes through the digital interpolation filter 412 for phase adjustment or correction. The digital timing interpolation filter 412 may then adjust, based on the phase determined by the phase module 410, a phase of the data samples to provide phase-adjusted data samples 414. By so doing, the use of a long synchronization sequence can be avoided, as there is no need to continuously receive a synchronization sequence while the phase is being calculated.

The read/write channel 140 may identify a synchronization mark of the codeword segment in the phase-adjusted samples 414, as well as acquire timing lock and/or lock control loops to readback the codeword segment 220. In some cases, the read/write channel 140 aggregates segments of the codeword 214 from multiple media surfaces 210 and provides the codeword 214 to the storage media controller 136. In other cases, the read/write channel 140 may decode the codeword 214 and provide the data 212 to the storage media controller 136. Thus, the read/write channel 140 may convert the phase-adjusted data samples or other sampled signals into a digital signal and recover decoded data 212, which is provided to the storage media controller 136. Although not shown, the read/write channel 140 may include any suitable combination of an equalizer module, a detector module, an adaptation module, or a gain module for detection, equalization, and/or decoding of data 212 from signals received from the pre-amp 134.

In some aspects, the storage media controller 136 enables the read back of segments 220 of one or more codewords by providing the interleave indices 144 or segment-surface address data 146 for the codewords to be read back. In some cases, the storage media controller 136 generates and/or maintains the segment-surface address data 146 as an extension (e.g., lookup table 305) or supplement to an LBA table to enable the mapping of logical blocks of user data to codewords, and thus codeword segments, interleaved across multiple media surfaces 210. For example, for a given interleaver group of codewords or for a subset of the group, the index selector 304 of the storage media controller 136 may provide interleave indices and/or segment-surface address data for the codewords of the interleaver group to be read back (e.g., 0, 1, 2, . . . 14, 15). An interleave index may be configured to indicate a pattern or mapping of how segments of a codeword are interleaved within respective sector partitions of multiple media surfaces. In aspects, a storage media controller 136 may implement or generate a set of the interleave indices that are each different from one another, such that by cycling through the interleave indices enables the read/write channel 140 to write or read sequences of codeword segments via predefined patterns across the multiple media surfaces. In some cases, the read/write channel 140 may generate, based on the interleave indices or segment-surface address data 146, respective location indices (e.g., physical locations in the respective sectors of the media surfaces) for those segments 220 of codewords that will be read back.

To facilitate read back of the codeword segments, the storage media controller 136 may also generate a read gate signal (read gate 416 or read signal) indicating a start or position of one or more physical sectors on the media surfaces. In aspects, the storage media controller 136 may read from multiple media surface 210 serially or in parallel, and thus may generate read gate signals for multiple read heads 132 on the actuators 204 of the HDD 118. Thus, based on an interleave index or segment-surface address data, the read/write channel 140 may select or multiplex read signals from different read heads 132 to readback codeword segments from one or more of the multiple media surfaces. In response to the read gate 416, the read/write channel 140 may determine, based on the location index, if a codeword segment is to be read from a partition of the respective sector of a media surface. When there is no codeword segment to read, the read/write channel 140 may block the read gate 416 until a next sector partition to prevent reading of an unintended codeword segment. At a next sector partition, the read/write channel 140 may check again to see if there are any codeword segments to read. When there is a codeword to read to the partition of the sector, the read/write channel 140 may unblock the read gate 416 to read the codeword segment, which may also include a pre-amble, synchronization mark, and/or post amble. The read/write channel 140 or interleaver 142 may continue processing the codeword segments in similar fashion until the reading of the interleaver group or subset of the interleaver group is complete.

Techniques of Codeword Interleaving Over Magnetic Media Surfaces

The following discussion describes techniques for codeword interleaving over magnetic media surfaces, which may write segments of codewords to multiple media surfaces to improve reliability of data readback when one or more sectors of magnetic media are degraded. These techniques may be implemented using any of the environments and entities described herein, such as the read/write channel 140, interleaver 142, interleave indices 144, segment-surface address data 146, or buffered timing recovery circuit 148. These techniques include methods illustrated in FIGS. 5, 7, 9, 11, and 13-15, each of which is shown as a set of operations performed by one or more entities.

The described methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, aspects of the methods described may be combined to implement codeword interleaving for writing codeword segments over multiple media surfaces and/or reading codeword segments from multiple media surfaces to reconstruct user data. By so doing, the described aspects may improve reliability of data stored on the multiple media surfaces, particularly when sectors of magnetic media are overwritten by head drift or track sections are degraded due to ATE or ATI.

In portions of the following discussion, reference will be made to the operating environment 100 of FIG. 1, entities of FIG. 2, FIG. 3, and/or FIG. 4, or example media surfaces described with reference to FIG. 6, FIG. 8, FIG. 10, or FIG. 12. Although described in reference to respective methods, an interleaver may implement any combination of operations from the methods and/or use interleave patterns illustrated by FIG. 6, FIG. 8, FIG. 10, or FIG. 12 to provide aspects of codeword interleaving over magnetic media surfaces. Such reference is not to be taken as limiting described aspects to the operating environment 100, entities, configurations, media surfaces, or implementations, but rather as illustrative of one of a variety of examples. Alternatively or additionally, operations of the methods may also be implemented by or with entities described with reference to the System-on-Chip of FIG. 16 and/or the storage media controller of FIG. 17.

Figure 5:
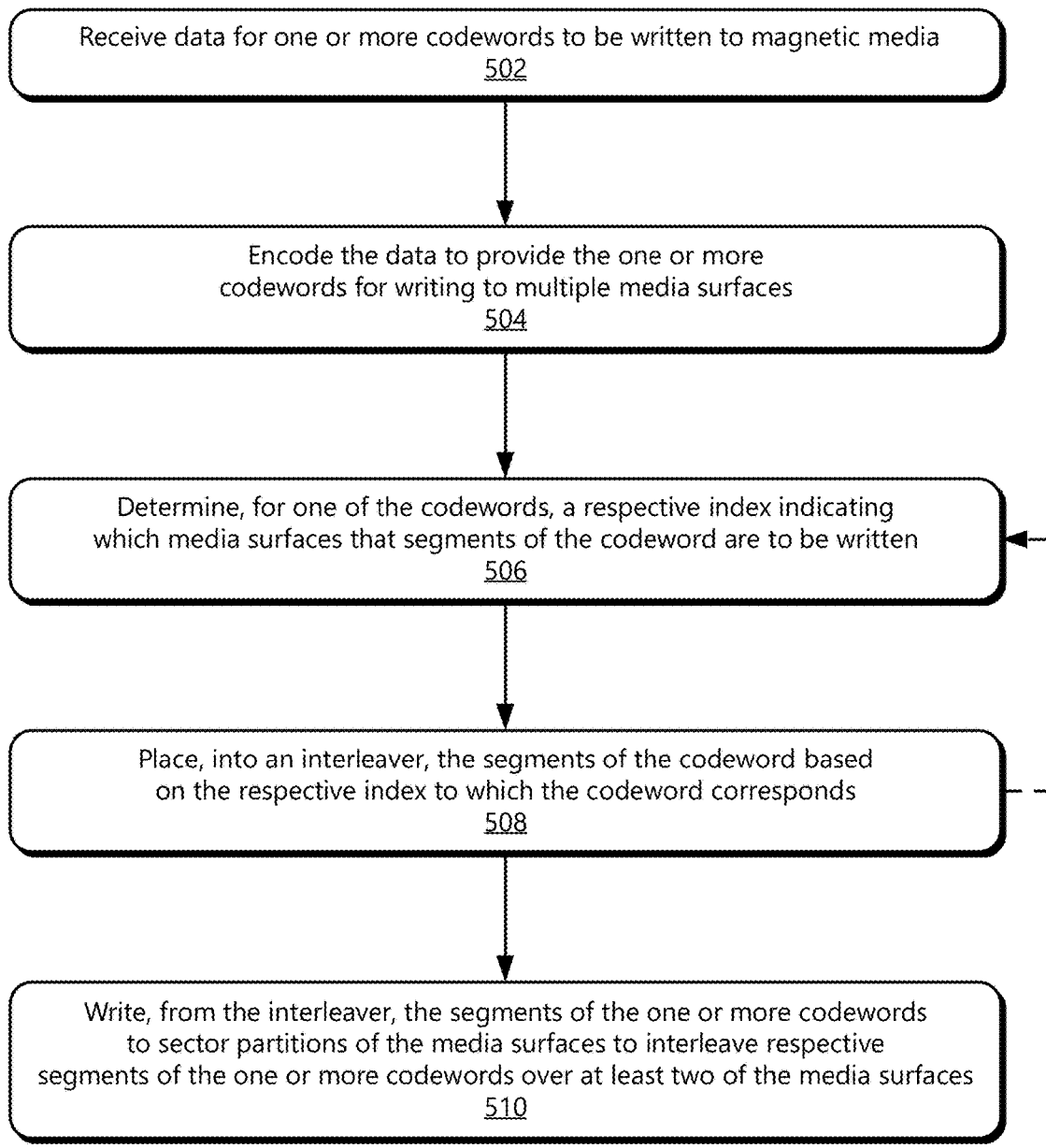
FIG. 5 depicts an example method for interleaving codeword segments over magnetic media surfaces in accordance with one or more aspects.
Figure 6:
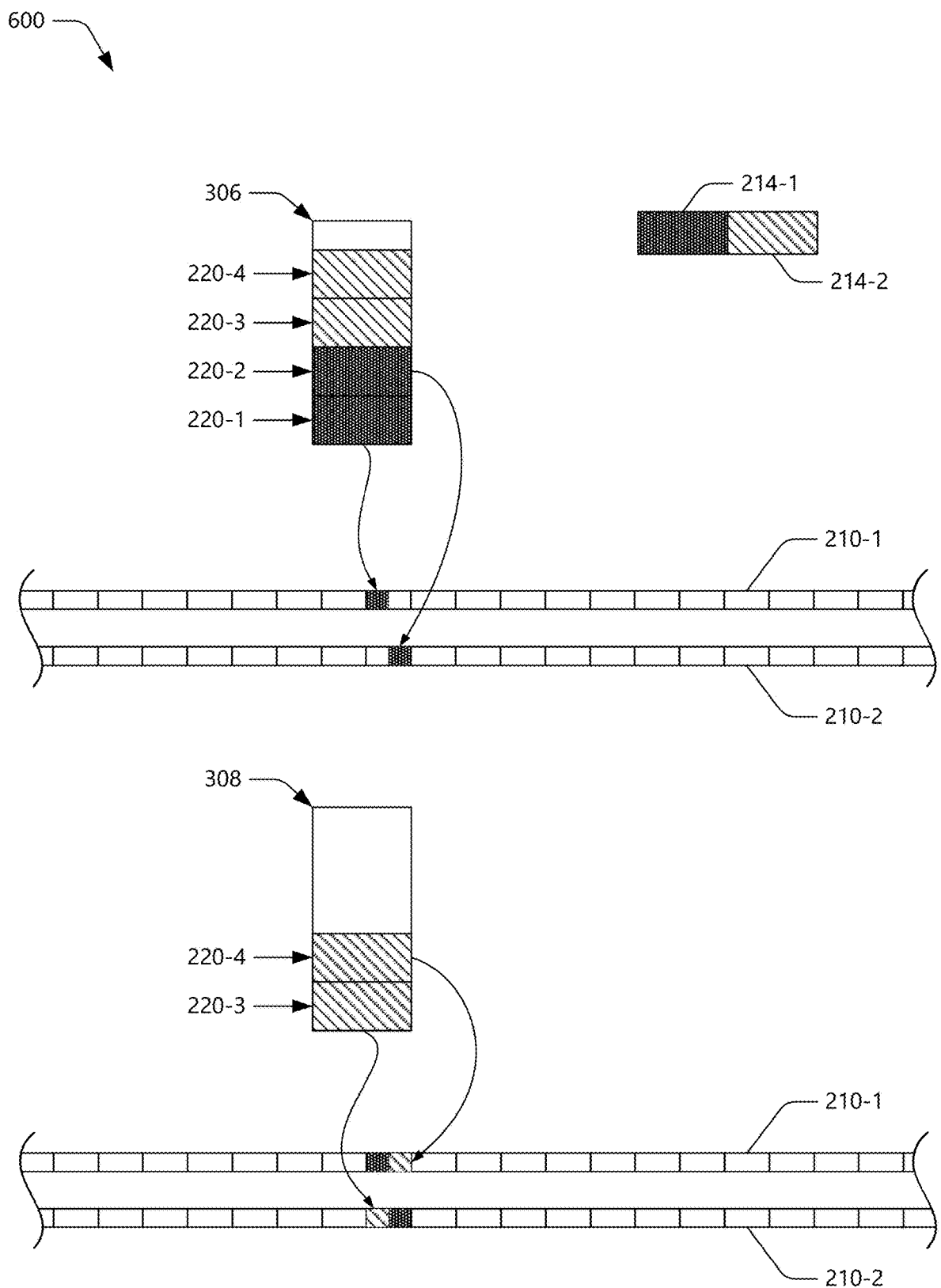
FIG. 6 illustrates example media surfaces to which interleaved codeword segments are written.

FIG. 5 depicts an example method 500 for interleaving codeword segments over magnetic media surfaces in accordance with various aspects. The operations of method 500 may be performed by or with the read/write channel 140, interleaver 142, interleave indices 144, and/or segment-surface address data 146. Alternatively, data for one codeword may be received, such that method 500 is implemented to write segments of the one codeword across multiple surfaces of magnetic media.

At 502, data for one or more codewords is received. The data may correspond to codewords that are to be written to or across respective sectors of multiple media surfaces of a magnetic media drive. In some cases, the data is unencoded data or user data received from a host or storage media controller. Data for a codeword may also be referred to or correspond to a sector of user data or a quantity of data to write to a sector of the media track. In other words, a "sector" of user data may include an amount of user data that corresponds to an approximate size of a physical sector of media track or recording media. By way of example, assume that a storage media controller has assigned sectors of media track on two media surfaces to an interleaver group and has received two sectors' worth of user data from a host. A read/write channel may receive the two sectors of user data from the host or data for encoding two codewords to interleave across the respective sectors on the two media surfaces of the interleaver group.

At 504, the data is encoded to provide the one or more codewords of encoded data for writing to multiple media surfaces of the magnetic media. In some cases, the data may be encoded with an ECC to provide the codewords. The ECC may include one of a Reed-Solomon (RS), Bose, Ray-Chaudhuri, Hocquenghem (BCH), low-density parity-check (LDPC), Turbo codes, polar codes, or another error correcting code. Generally, the encoding of the data of the codeword may enable reconstruction or decoding of a codeword from fewer than all of the encoded segments of the codeword that are spread over the multiple media surfaces of the media drive. By way of example, consider FIG. 6 which illustrates at 600 example media surfaces 210-1 and 210-2 to which interleaved codeword segments are written in accordance with various aspects. Here, a read/write channel encodes data for the code words 214-1 and 214-2 to provide encoded data for writing to the multiple media surfaces 210-1 and 210-2.

At 506, a respective index is determined for the one or more codewords that indicates which surfaces that segments of the codeword are to be written. The respective index for the codeword may be received from a storage media controller (e.g., as a predefined index, pattern, or mapping), which may link and maintain the index of the codeword with a logical block address of the user data of the codeword, such that the controller can use the index to readback the segments of the codeword from the multiple media surfaces. In some cases, the respective index of the codeword may be assigned from a pool or set of codewords provided by the storage media controller, and a read/write channel may provide an indication to the controller of which index is assigned to the codeword by the read/write channel. The index may include an interleave index, which may be pre-defined or referenced by a unique index (e.g., 0, 1, . . . 63, 64). In some cases, an indication of the respective index is received, enabling the selection of the respective index for a codeword. In the context of the present example, the read/write channel may receive, from the storage media controller, unique references to two interleave indices (e.g., 0, 1) for the two codewords 214-1 and 214-2 (or sectors) of user data. The storage media controller may have these interleave indices mapped to LBAs for the user data of the codewords in segment-surface mapping data maintained by the controller.

At 508, the segments of the codeword are placed (or arranged) into an interleaver based on the respective index to which the codeword corresponds. The codewords may be divided or split into segments of approximately a same size or that correspond to a size of sector partition to which the segments will be written. In some cases, a size of the segments is configured based on a size of an interleaver group (e.g., number of respective sectors of multiple media surfaces) and codeword density of that interleaver group, such as a total number of codewords to be written across sectors of the interleaver group or media surfaces. In aspects, the segments of the codeword may be placed or organized by the interleaver in an interleave buffer based on the respective interleave indices of the codewords. For example, segments of multiple codewords may be placed or organized in the interleaver buffer based on a pattern for which the codeword segments are to be written to multiple media surfaces. The codeword segments may be placed in the interleave buffer sequentially or alternately based on whether the codeword segments will be written to multiple media surfaces in serial fashion to alternating surfaces or parallel fashion to multiple surfaces. Continuing the present example, the interleaver places the codeword segments 220-1 and 220-2 of codeword 214-1 into the interleave buffer for serial writing to the media surfaces 210-1 and 210-2.

Optionally, from operation 508, the method 500 may return to operation 506 to determine a respective index for a next codeword and place the segments of the next codeword into the interleaver. By so doing, operations 506 and/or 508 may be repeated until each of the one or more codewords is encoded, assigned a respective interleave index, and respective segments of the codeword are placed into the interleaver. In the context of the present example illustrated in FIG. 6, the interleaver places segments 220-3 and 220-4 of codeword 214-2 into respective slots of the interleave buffer 306 for serial writing to the media surfaces 210-1 and 210-2. As described herein, the interleaver or read/write channel may place the codeword segments 220-1 through 220-4 into corresponding slots of the interleave buffer partition 310 based on respective interleave indices associated with or corresponding to each of the codewords 214.

At 510, the segments of the one or more codewords are written from the interleaver to sector partitions of the media surfaces to interleave respective segments of the one or more codewords over at least two of the media surfaces. The codeword segments may be written serially by respective write heads to one media surface at a time or written in parallel via multiple respective write heads to the media surfaces. In some cases, the codeword segments are written to same tracks of the media surfaces, such as when the media drive includes single or dual actuators. In other cases, the codeword segments may be written to different respective tracks of the media surfaces, such as when the media drive is implemented with dual stage or triple stage actuators that enable write heads to shift over a range of 5-10 tracks from a given actuator arm position.

Before or during the writing of the codeword segments, the read/write channel may insert into the codeword segment identifiers to enable identification of the segments that correspond to the codeword during or after read back of the segments from the media surfaces. The identifiers may include sub-sector preambles or sub-sector synchronization indicators, which may be unique to the codeword or sequentially assigned to the segments to enable ordering of the segments of the codeword when read back from the media surfaces. With respect to writing sector partitions of a given media surface, a write signal indicating a start of a sector or sector partition may be received. In some cases, the write signal and a location index for segments of the codeword may be used to determine which sector partitions of the media surface to write the segments of the codeword. Optionally, the write signal may be blocked for sectors or partitions to which a codeword segment will not be written.

In aspects, the segments of the codeword are written to corresponding partitions of respective sectors of the media surfaces based on location indices determined for the segments. Based on these location indices for the codeword segments, the segments may be written from the interleaver or interleave buffer as the write heads encounter the sectors of the interleaver group across the media surfaces. The respective segments of the one or more codewords may be written in-order or out-of-order. For example, an interleave buffer or interleaver block may be populated with respective interleaved segments of multiple codewords (e.g., codewords 214-1, 214-2, etc.). The storage media controller, read/write channel, or interleaver may write fewer than all of the interleaved codewords and/or in any suitable order. For example, the read/write channel may write a first segment of one of the codewords to a first sector partition on a first one of media surfaces and write, during a same revolution of the media surfaces, a second segment of the codeword to a second sector partition on a second media surface, with the second sector partition being offset from the first sector partition (e.g., serial or sequential writing). Alternatively, the read/write channel may write codeword segments to multiple media surfaces in parallel fashion using multiple write heads at the same time or concurrently. Concluding the present example of FIG. 6, the codeword segments 220-1 and 220-2 of the codeword 214-1 are written serially to sector partitions of the media surface 210-1 and 210-2. In other words, the read/write channel may write the first codeword segment 220-1 to the first media surface 210-1 and then jump to the second media surface 210-2 to write the second codeword segment 220-2. The read/write channel can then write the codeword segment 220-3 of the codeword 214-2 to the second media surface 220-2 and then jump back to the first media surface 210-2 to write the second codeword segment 220-4 of the codeword 214-2.

Figure 7:
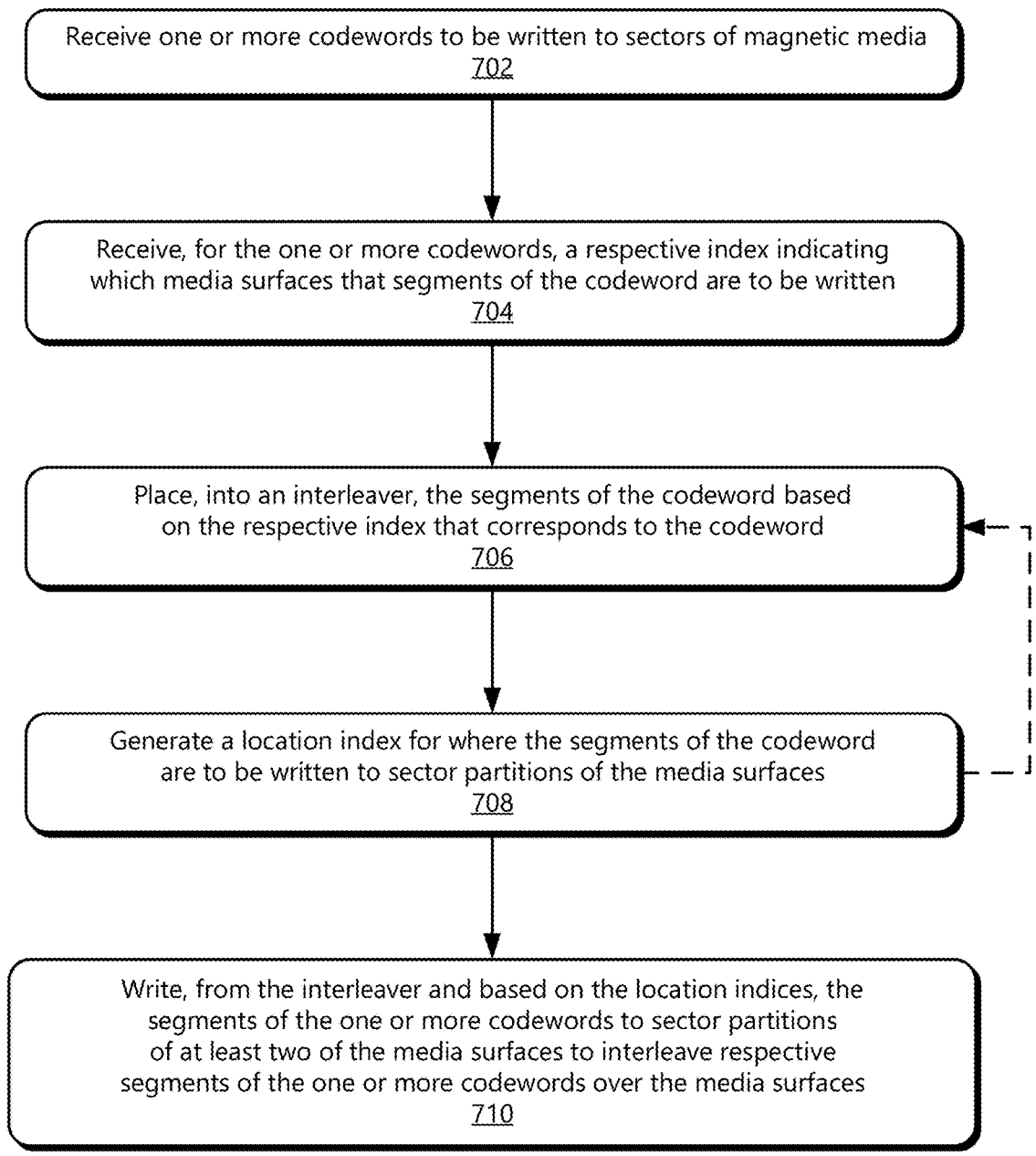
FIG. 7 depicts an example method for writing segments of codewords based on location indices in accordance with one or more aspects.
Figure 8:
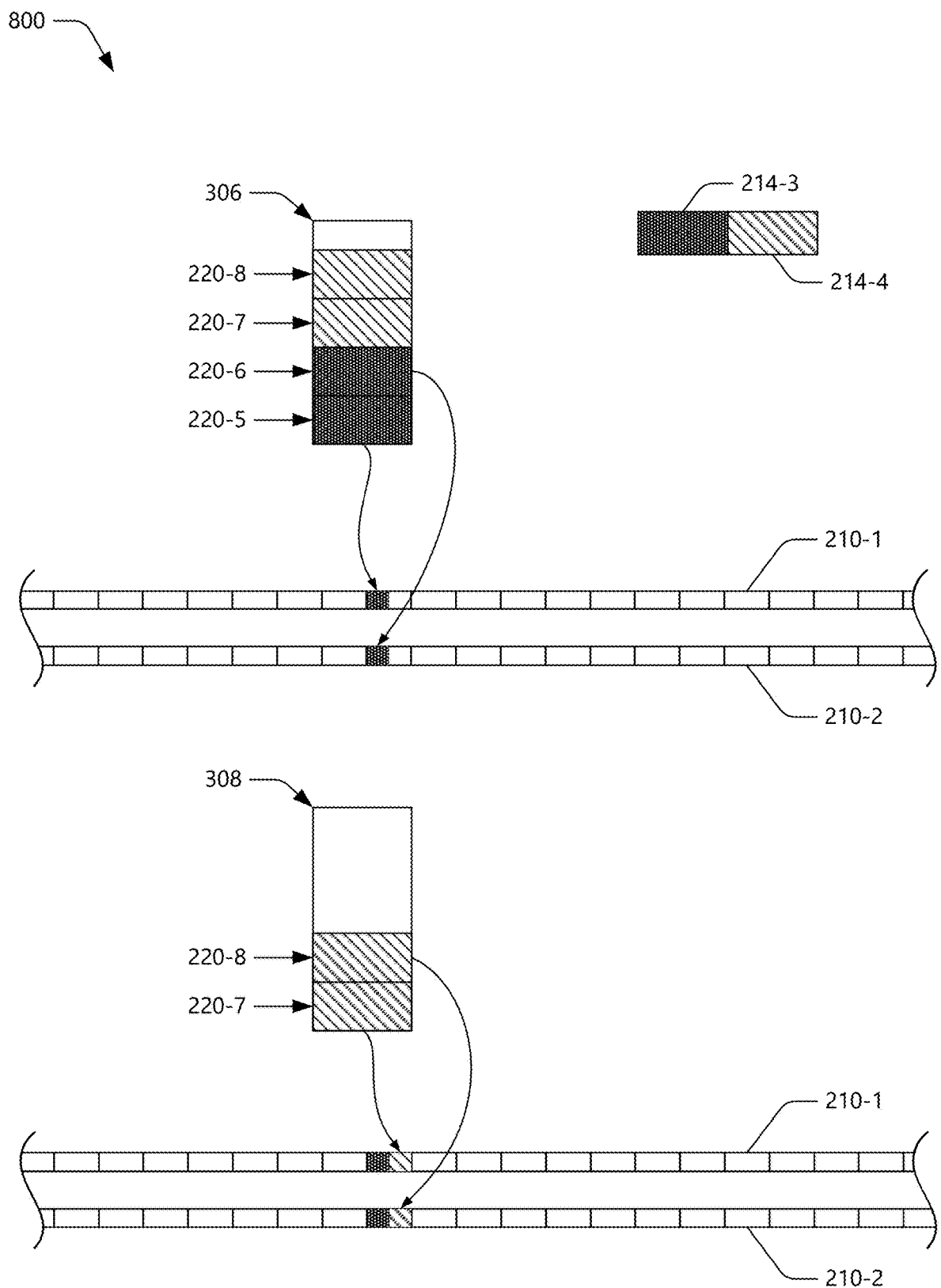
FIG. 8 illustrates example media surfaces to which interleaved codeword segments are written in parallel.

FIG. 7 depicts an example method 700 for writing segments of codewords based on location indices in accordance with various aspects. The operations of method 700 may be performed by or with the read/write channel 140, interleaver 142, interleave indices 144, and/or segment-surface address data 146. Alternatively, one codeword may be received, such that method 700 is implemented to write segments of the one codeword across surfaces of magnetic media.

At 702, one or more codewords are received. The one or more codewords are to be written to respective sectors of multiple media surfaces of a storage media drive. In some cases, the codewords are encoded data that corresponds to sectors of user data. The codewords may be received from a storage media controller. A size of the codeword may correspond to an amount of data in a sector of user data or a quantity of data to write to an interleaved sector of the media. In aspects, the codewords are received by an interleaver for writing to or across respective sectors of multiple media surfaces of a magnetic media drive. Various examples of codewords are described herein, such as with reference to FIGS. 2-5, aspects of which may be utilized when implementing the method 700.

At 704, a respective index is received for the one or more codewords that indicates which media surfaces that segments of the codeword are to be written. The index may include an interleave index, such as a pre-defined index or referenced by a unique index identifier (e.g., 0, 1, . . . 14, 15). In some cases, an indication of the respective index is received, enabling the interleaver to select the respective index for a codeword from a set or pool of interleave indexes. In aspects, the storage media controller may associate the respective indices assigned to the codewords in segment-surface address data to track or maintain a relationship of codewords of user data to sector partition locations over multiple media surfaces. By way of example, consider FIG. 8 which illustrates at 800 example media surfaces 210-1 and 210-2 to which interleaved codeword segments are written in accordance with various aspects. Here, the interleaver receives codewords 214-3 and 214-4 from the storage media controller along with respective interleave indices for writing the codeword 214 in parallel to media surfaces 210-1 and 210-2.

At 706, the segments of the codeword are placed (or arranged) into the interleaver based on the respective index that corresponds to the codeword. The interleaver may divide or split the codewords into segments of approximately a same size or that correspond to a size of sector partition (or sector slot) to which the segments can be written. In aspects, a segment size may not correspond to a size of an interleaver group, such that the interleaver may select to use a segment size of one half of a sector for an interleaver group of three sectors. Alternatively, the interleaver may use eight segments per codeword ($1/8$) with an interleaver group of 16 sectors, 12 sectors, and so forth. In other aspects, a size of the segments (e.g., $1/4^{th}$ to $1/16^{th}$ of a sector) may be configured based on a size of an interleaver group (e.g., number of sectors (4 sectors, 16 sectors, 32 sectors, 64 sectors, etc.)) and codeword density of that interleaver group, such as a total number of codewords (4, 16, 32, 64, etc.) to be written across the media surfaces of the interleaver group. Thus, the interleaver or read channel may use same or different ratios between an interleaver group size and segments per codeword. In the context of the present example and based on the indices for parallel writing of codeword segments, the interleaver places codeword segments 220-5 and 220-6 of the codeword 214-3 in the interleave buffer 306 first and then codeword segments 220-7 and 220-8 of the codeword 214-4.

At 708, a location index (or indicator) is generated for where the segments of the codeword are to be written to the respective sector partitions of the media surfaces. In some cases, a location index is generated or determined for the segments of a codeword based on an interleave index or segment-surface address data that corresponds to the codeword. Alternatively or additionally, the location index may be determined based on position of a codeword within an interleaver or interleave buffer. Optionally, from operation 708, the method 700 may return to operation 706 to arrange or place segments of another codeword into the interleaver and/or generate (or determine) a location index for segments of the codeword. By so doing, operations 706 and/or 708 may be repeated until each of the one or more codewords is encoded, indexed via physical location, and the respective segments of the codeword placed into the interleaver. Continuing the present example, the interleaver determines location indices for the segments 220 of the codewords 220-5 and 220-6 on the media surfaces 210-1 and 210-2. Here, assume the locations for the segments of each code are configured for parallel writing with no offset between segments of each codeword in the same tracks on the media surfaces.

At 710, the segments of the one or more codewords are written from the interleaver to respective sector partitions of at least two of the media surfaces based on based on the location indices. By so doing, the respective segments of the one or more codewords are interleaved over the media surfaces of the storage media drive. The segments of the codewords may be written in any suitable interleave pattern, such as serially or in parallel across multiple media surfaces. When writing to sectors in tracks on different media surfaces, the read/write channel may write to same tracks or different tracks. For example, when the media drive includes dual stage or triple stage actuators, the read/write channel may write, concurrently or serially, to different respective tracks on the media surfaces. In some cases, the read/write channel concurrently writes codeword segments in parallel to multiple media surfaces using multiple respective write circuits (e.g., pre-amp, write-head). For example, the read/write head can write a first segment of a codeword to a first sector partition on a first media surfaces while writing, during a same revolution, a second segment of the codeword on a second media surfaces, with no offset between the first and second sector partitions. Concluding the present example, the read/write channel writes codeword segments 220-5 and 220-6 to the media surfaces 210-1 and 210-2, respectively, and then writes codeword segments 220-7 and 220-8 to next available sector partitions on the media surfaces 210-1 and 210-2. Note that the read/write channel 140 may write the segments of the two codewords during a same revolution or on separate revolutions of the magnetic media disks.

Figure 9:
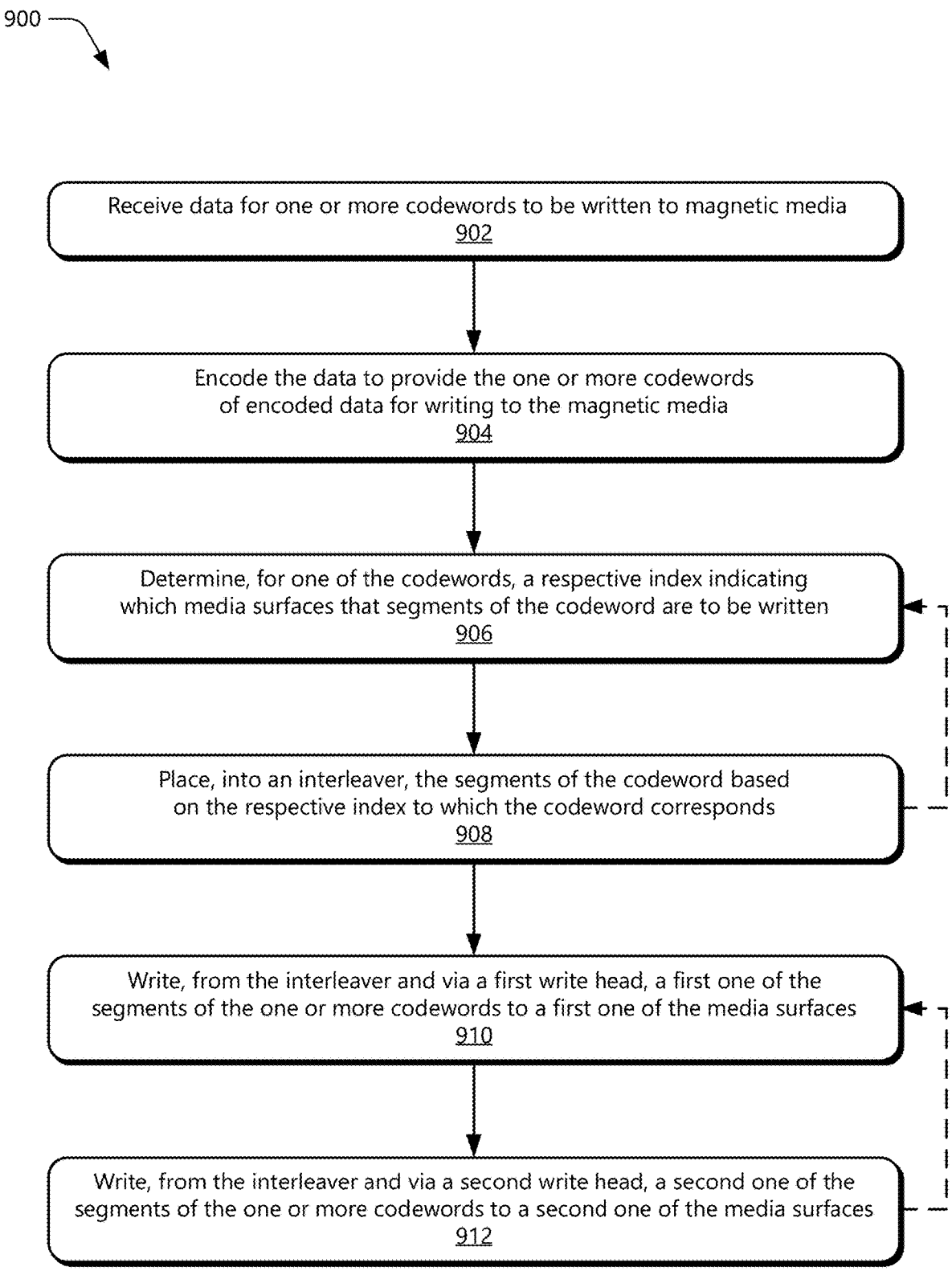
FIG. 9 depicts an example method for writing interleaved codewords over media surfaces with respective write heads in accordance with one or more aspects.
Figure 10:
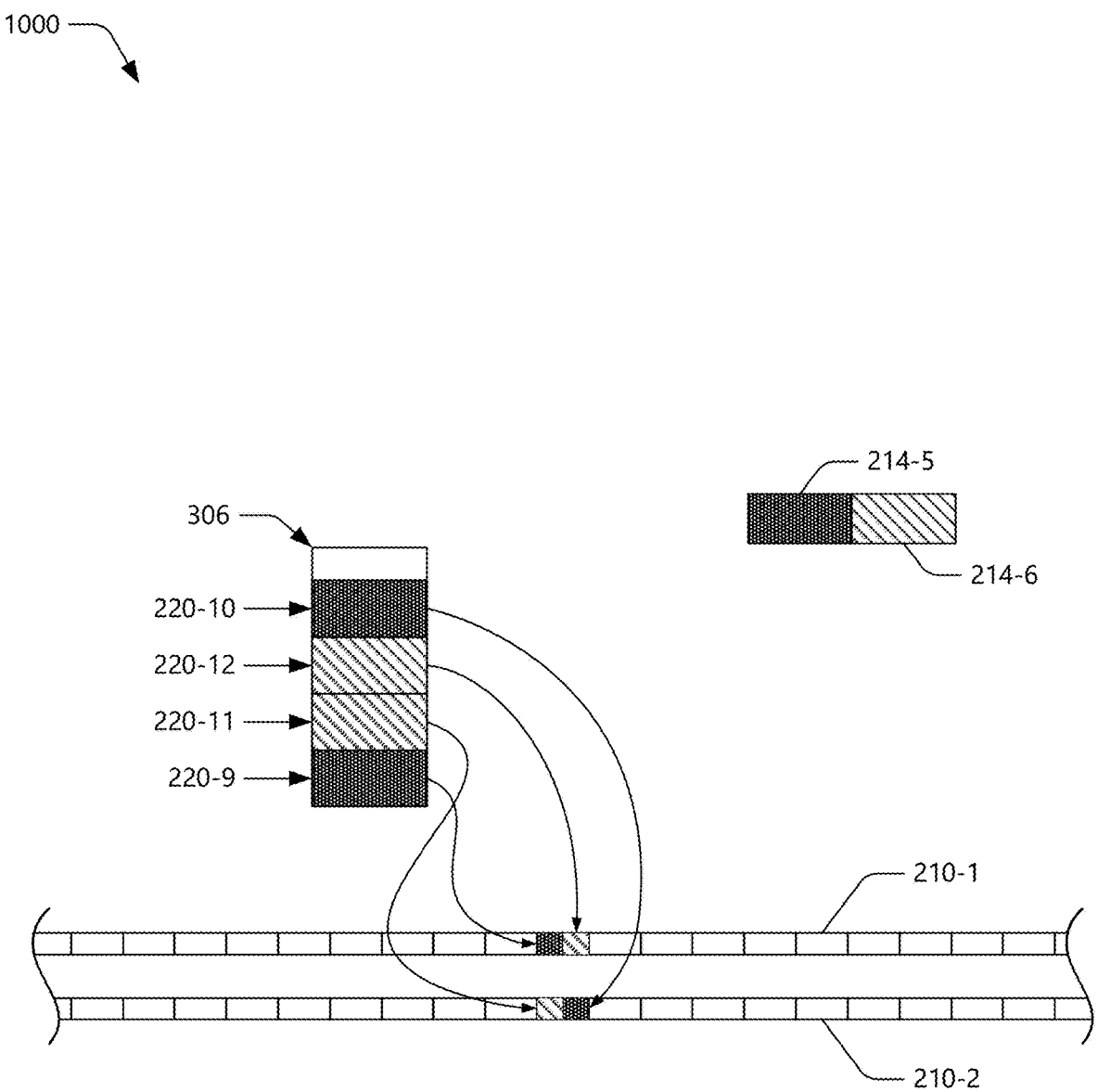
FIG. 10 illustrates example media surfaces to which interleaved codeword segments are written concurrently.

FIG. 9 depicts an example method 900 for writing interleaved codewords over media surfaces with respective write heads in accordance with various aspects. The operations of method 900 may be performed by or with the read/write channel 140, interleaver 142, interleave indices 144, and/or segment-surface address data 146. Alternatively, one codeword may be received, such that method 900 is implemented to write segments of the one codeword across surfaces of magnetic media.

At 902, one or more codewords are received. The one or more codewords are to be written to respective sectors of multiple media surfaces of a storage media drive. In aspects, the codewords are received by an interleaver for writing to or across respective sectors of the multiple media surfaces. Various examples and uses of codewords are described herein, such as with reference to FIGS. 2-5 and FIG. 7, aspects of which may be utilized when implementing the method 900.

At 904, the data is encoded to provide the one or more codewords of encoded data for writing to multiple media surfaces of the magnetic media. In some cases, the data is encoded with an ECC to provide the codewords. The ECC may include one of a Reed-Solomon (RS), Bose, Ray-Chaudhuri, Hocquenghem (BCH), low-density parity-check (LDPC), Turbo codes, polar codes, or another error correcting code. By way of example, consider FIG. 1000 which illustrates at 1000 example media surfaces 210-1 and 210-2 to which interleaved codeword segments are written in accordance with various aspects. Here, a read/write channel or the storage media controller encodes data for the code words 214-5 and 214-6 to provide encoded data for writing to the multiple media surfaces 210-1 and 210-2.

At 906, a respective index is determined for the one or more codewords that indicates which sector surfaces that segments of the codeword are to be written. The respective index for the codeword may be received from a storage media controller (e.g., as a predefined index, pattern, or mapping), which may link and maintain the index of the codeword with a logical block address of the user data of the codeword, such that the controller can use the index to readback the segments of the codeword from the multiple media surfaces. In some cases, the respective index of the codeword may be assigned from a pool or set of codewords provided by the storage media controller, and a read/write channel or interleaver may provide an indication to the controller of which index is assigned to the codeword by the read/write channel. Various examples of interleaver indices are described herein, such as with reference to FIGS. 2-7, aspects of which may be utilized when implementing the method 900. In the context of the present example, the read/write channel may receive, from the storage media controller, unique references to two interleave indices (e.g., 13, 14) for the two codewords 214-5 and 214-6 (or sectors) of user data.

At 908, the segments of the codeword are placed into the interleaver based on the respective index that corresponds to the codeword. The interleaver may divide or split the codewords into segments of approximately a same size or that correspond to a size of sector partition (or sector slot) to which the segments can be written. Various examples of segmenting codewords and/or organizing segments into an interleave buffer are described herein, such as with reference to FIGS. 2-7, aspects of which may be utilized when implementing the method 900. Optionally, from operation 908, the method 900 may return to operation 906 to determine a respective index for a next codeword and place the segments of the next codeword into the interleaver. By so doing, operations 906 and/or 908 may be repeated until each of the one or more codewords is encoded, assigned a respective interleave index, and respective segments of the codeword are placed into the interleaver or interleave buffer. In the context of the present example and based on indices for parallel writing to multiple surfaces, the interleaver places codeword segments 220-9 and 220-10 of codeword 214-5 and codeword segments 220-11 and 220-12 of codeword 214-6 in the interleave buffer 306. Note that the ordering or placement of the codeword segments 220 in the interleave buffer may be non-sequential such that the codeword segments are written from the interleave buffer to alternate positions or offsets between the media surfaces.

At 910, a first segment of the codewords is written from the interleaver to a first media surface via a first write head, and at 912, a second segment of the codewords is written from the interleaver to a second media surface via a second write head. In aspects, the first segment and the second segment are written concurrently without offset between the sector partitions to which the segments are written. Optionally, from operation 912, the method 900 may return to operation 910 to write another segment of the codewords to the first media surface and may proceed to 912 to write yet another segment of the codewords to the second media surface. During subsequent iterations of the operations of the method 900, segments of the codewords may be written to other media surfaces, such that the segments of one codeword are spread over three or more media surfaces. Concluding the present example, the read/write channel concurrently writes codeword segment 220-9 to the first media surface 210-1 via a first write head and writes codeword segment 220-11 to the second media surface 210-2 via a second write head. At a next write interval, the read/write channel then concurrently writes codeword segment 220-12 to the first media surface 210-1 via the first write head and writes codeword segment 220-10 to the second media surface 210-2 via the second write head.

Figure 11:
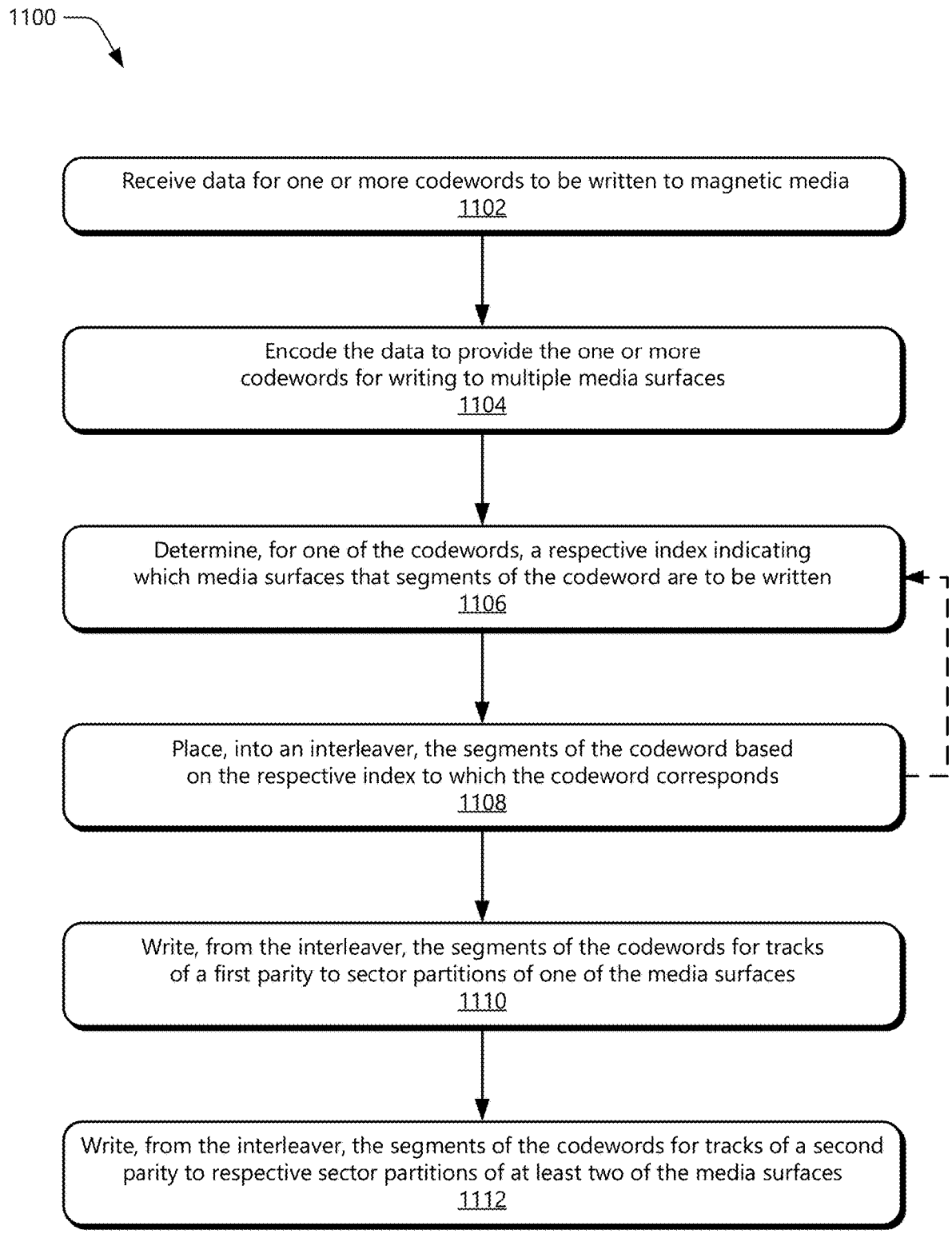
FIG. 11 depicts an example method for interleaving codewords over media surfaces based on track assignment in accordance with one or more aspects.
Figure 12:
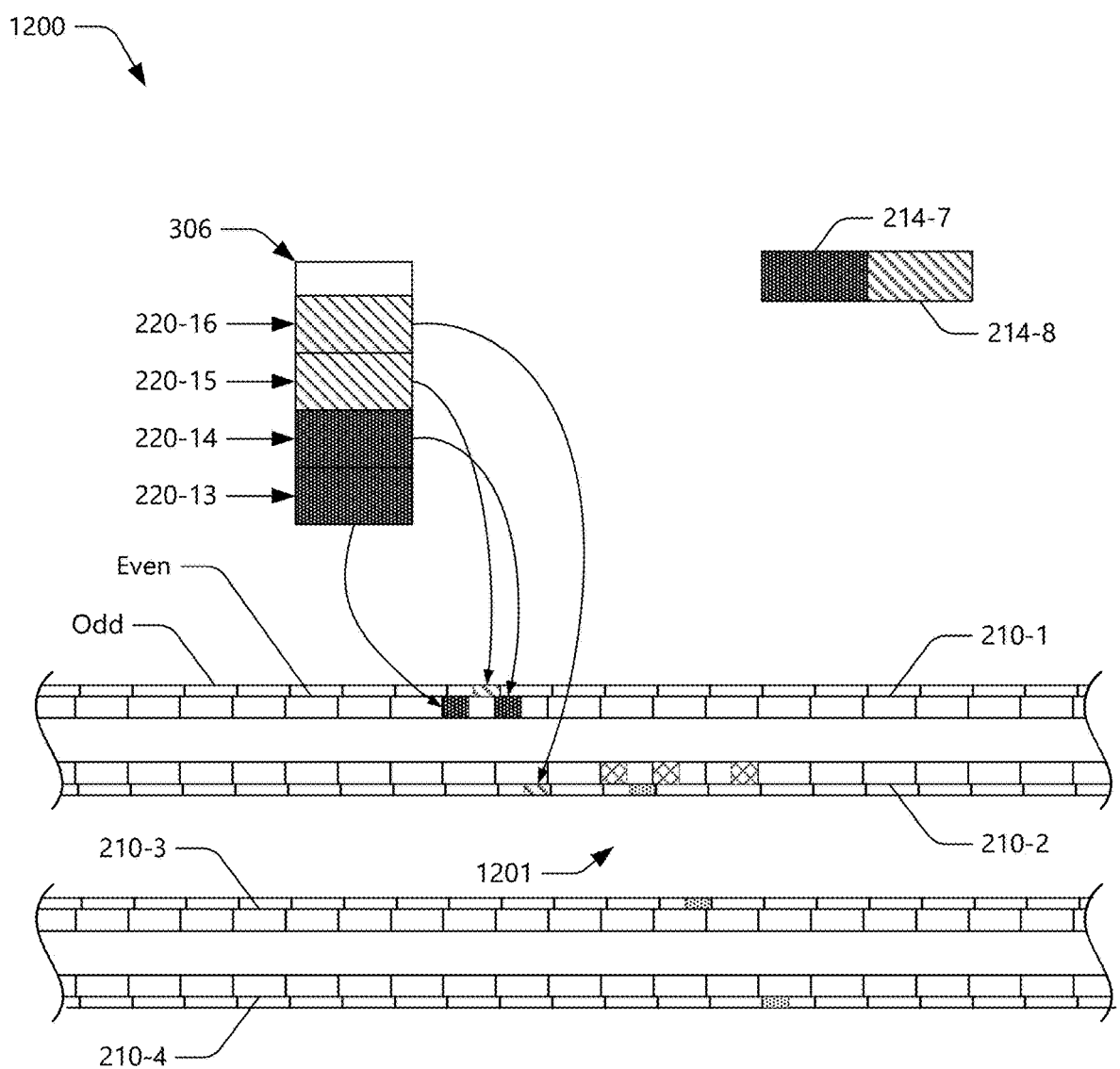
FIG. 12 illustrates example media surfaces to which interleaved codeword segments are written based on track parity.

FIG. 11 depicts an example method for interleaving codewords over media surfaces based on track assignment in accordance with various aspects. The operations of method 1100 may be performed by or with the read/write channel 140, interleaver 142, interleave indices 144, and/or segment-surface address data 146. Alternatively, one codeword may be received, such that method 1100 is implemented to write segments of the one codeword across surfaces of magnetic media.

At 1102, data for one or more codewords is received. The data may correspond to codewords that are to be written to or across respective sectors of multiple media surfaces of a magnetic media drive. In some cases, the data is unencoded data or user data received from a host or storage media controller. Various examples and uses of data for codewords are described herein, such as with reference to FIGS. 2-5 and FIG. 7, aspects of which may be utilized when implementing the method 1100.

At 1104, the data is encoded to provide the one or more codewords for writing to multiple media surfaces of the magnetic media. In some cases, the data may be encoded with an ECC to provide the codewords. The ECC may include one of a Reed-Solomon (RS), Bose, Ray-Chaudhuri, Hocquenghem (BCH), low-density parity-check (LDPC), Turbo codes, polar codes, or another error correcting code. By way of example, consider FIG. 12 which illustrates at 1200 example media surfaces 210-1, 210-2, 210-3, and 210-4 to which interleaved codeword segments are written in accordance with various aspects. Here, a read/write channel encodes data for the code words 214-7 and 214-8 to provide encoded data for writing to the multiple media surfaces 210.

At 1106, a respective index is determined for the one or more codewords that indicates which surfaces that segments of the codeword are to be written. The respective index for the codeword may be received from a storage media controller (e.g., as a predefined index, pattern, or mapping), which may link and maintain the index of the codeword with a logical block address of the user data of the codeword, such that the controller can use the index to readback the segments of the codeword from the multiple media surfaces. Various examples and uses of interleave indices are described herein, such as with reference to FIGS. 2-5, FIG. 7, and FIG. 9, aspects of which may be utilized when implementing the method 1100. In the context of the present example, the read/write channel may receive, from the storage media controller, unique references to two interleave indices (e.g., 31, 32) for the two codewords 214-7 and 214-8 of user data. Assume here that segments of codeword 214-7 are assigned to or allocated for writing to an odd track of media and that segment of the codeword 214-8 are assigned to or allocated for writing to an even track of media.

At 1108, the segments of the codeword are placed into an interleaver based on the respective index to which the codeword corresponds. The codewords may be divided or split into segments of approximately a same size or that correspond to a size of sector partition to which the segments will be written. Various examples and uses of the interleaver or interleave buffer are described herein, such as with reference to FIGS. 2-5, FIG. 7, and FIG. 9, aspects of which may be utilized when implementing the method 1100. The codeword segments may be placed in the interleave buffer sequentially or alternately based on whether the codeword segments will be written to multiple media surfaces in serial fashion to alternating surfaces or parallel fashion to multiple surfaces. Optionally, from operation 1108, the method 1100 may return to operation 1106 to determine a respective index for a next codeword and place the segments of the next codeword into the interleaver. Continuing the present example, the interleaver places the codeword segments 220-13, 220-14, 220-15 and 220-16 into the interleave buffer 206 in alternating order.

At 1110, the segments of the codewords for tracks of a first parity are written from the interleaver to sector partitions of one of the media surfaces, and at 1112, the segments of the codewords for tracks of a second parity are written from the interleaver to respective sector partitions of at least two of the media surfaces. For example, codeword segments assigned or allocated to an odd track can be written to a first media surface (surface 1) and other codeword segments assigned or allocated to an even track can be written to the first media surface and another media surface (surface 1 and surface 2). Alternatively, codeword segments assigned or allocated to an even track can be written to a first media surface (surface 2) and other codeword segments assigned or allocated to an odd track can be written to the first media surface and another media surface (surface 2 and surface 3).

Concluding the present example, the read/write channel writes codeword segments 220-13 and 220-14 to an even track of the first media surface 210-1, writes codeword segment 220-15 to an odd track of the first media surface 210-1, and writes codeword segment 220-16 to an odd track of the second media surface 210-2. As shown at 1201, the read/write channel may also split odd tracks of codeword segments between the second and third media surfaces 210-2 and 210-3, and so forth. Because track degradation (e.g., ATE or ATI) is caused by repeatedly writing adjacent tracks of media, splitting the codeword segments of one parity (e.g., odd or even) across multiple media surfaces can reduce the degradation of media tracks of the other parity.

Figure 13:
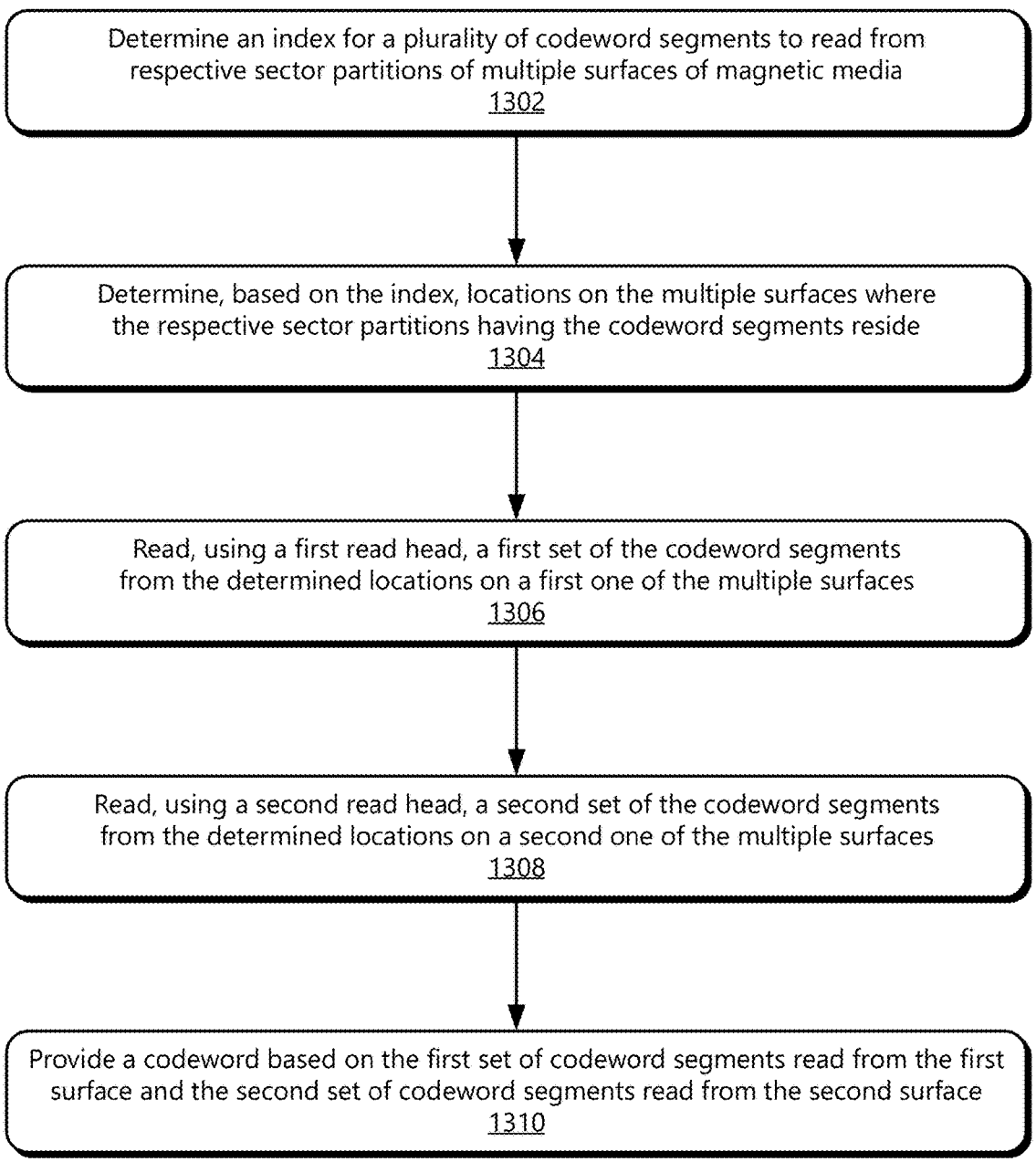
FIG. 13 depicts an example method for reading interleaved codeword segments for a plurality of codewords from respective surfaces of magnetic media.

FIG. 13 depicts an example method 1300 for reading interleaved codeword segments for a plurality of codewords from respective surfaces of magnetic media. The operations of method 1300 may be performed by or with the read/write channel 140, interleaver 142, interleave indices 144, segment-surface address data, 146, and/or buffered timing recovery circuit 148.

At 1302, an index is determined for a plurality of codeword segments to read from respective sector partitions of multiple surfaces of magnetic media. The index may be received from a storage media controller or determined based on segment-surface mapping data associated with a codeword to which the segments belong. The index may include an interleave index, which may be pre-defined or referenced by a unique index (e.g., 0, 1, . . . 62, 63). In some cases, an indication of the index is received, enabling a read/write channel to select the index or location data of the segments of the codeword to be read. For example, for a given interleaver group of codewords or for a subset of codewords of the group, an index selector of the storage media controller may provide interleave indices for the codewords of the interleaver group to be read back. Alternatively, an index for one codeword may be received, such that method 1300 is implemented to read segments of the one codeword from sectors of an interleaver group spread over multiple surfaces.

At 1304, locations on the multiple surfaces where the respective sector partitions having the codeword segments reside are determined based on the index. The locations may be determined, based on the received index, for multiple respective sectors on each of the multiple surfaces. In some cases, a location index for the segments of the codeword is determined based on an interleave index and/or segment-surface mapping data received from the storage media controller. Alternatively or additionally, surfaces on which the sector partitions reside may be determined based on track polarity. For example, odd tracks of sectors may reside on a first media surface while even tracks of sectors may be interleaved across the first media surface and a second media surface.

At 1306, a first set of the codeword segments are read from the determined locations on a first one of the multiple surfaces using a first read head. At 1308, a second set of the codeword segments are read from the determined locations on a second one of the multiple surfaces using a second read head. In some cases, a read channel uses multiple read circuits and/or read heads to read codeword segments from respective sectors of the multiple surfaces. The read channel may use the first read head and the second read head to read back the segment of the codeword from the multiple surfaces in parallel or in serial fashion. When reading back in parallel, the read channel may concurrently read segments of the codeword from the multiple surfaces concurrently and buffer the read signals for serializing and reconstructing the codeword. Alternatively, when reading in serial, the read channel can multiplex read signals from multiple read heads or read circuits to aggregate read signals for decoding the codeword.

At 1310, a codeword is provided based on the first set of codeword segments read from the first surface and the second set of codewords read from the second surface. In some cases, the codeword is provided based on codeword segments read from three or more surfaces of a media drive. With the segments of the codeword interleaved across multiple surfaces, read throughput of the read channel may be increased over other types of interleaving, such as codewords interleaved across non-contiguous sectors of media tracks.

Figure 14:
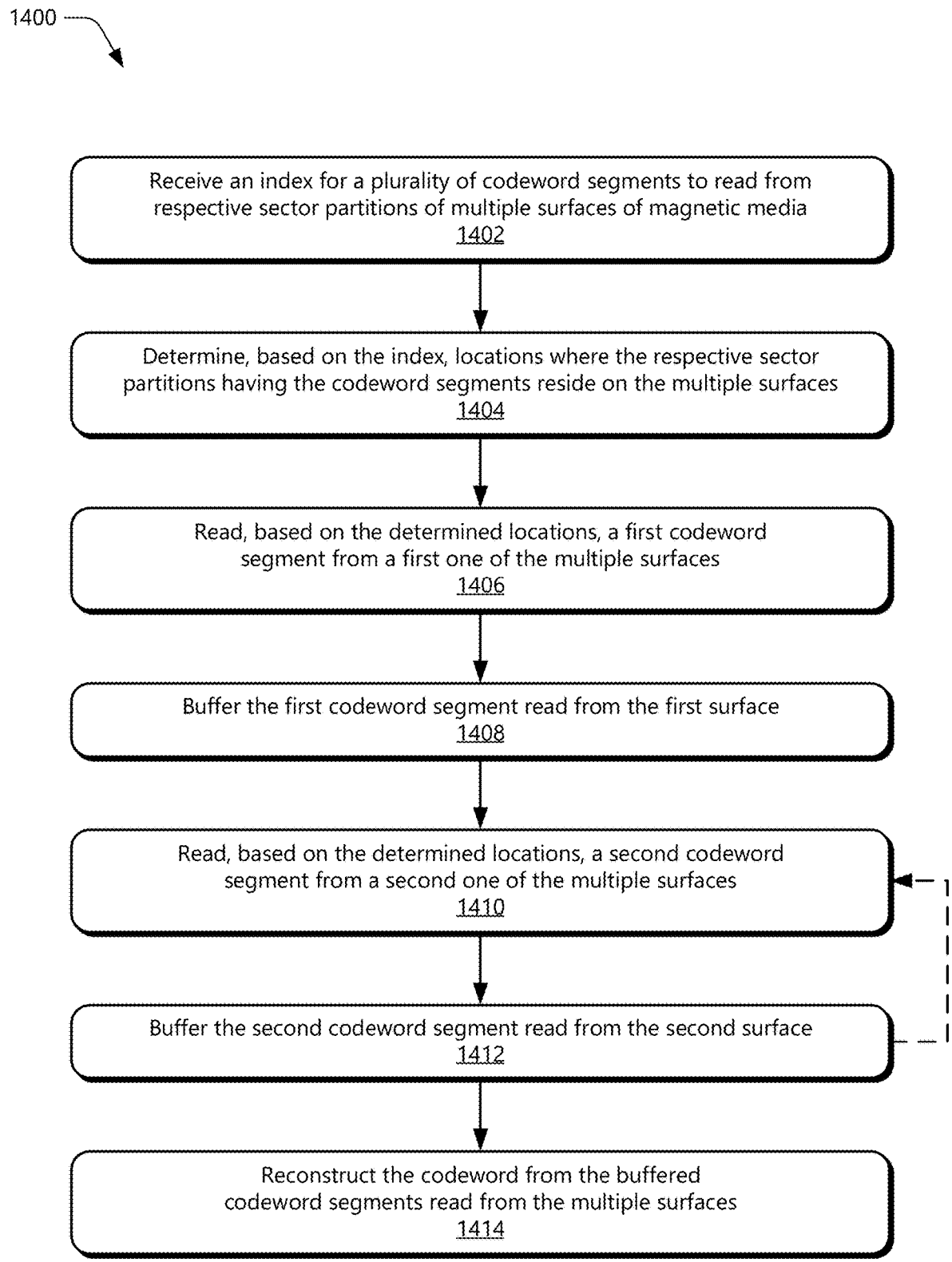
FIG. 14 depicts an example method for reconstructing codeword segments read from sector partitions on multiple magnetic media surfaces.

FIG. 14 depicts an example method for reconstructing codeword segments read from sector partitions on multiple magnetic media surfaces. The operations of method 1300 may be performed by or with the read/write channel 140, interleaver 142, interleave indices 144, segment-surface address data, 146, and/or buffered timing recovery circuit 148.

At 1402, an index is received for a plurality of codeword segments to read from respective sector partitions of multiple surfaces of magnetic media. The index may be received from a storage media controller or determined based on segment-surface mapping data associated with a codeword to which the segments belong. The index may include an interleave index, which may be pre-defined or referenced by a unique index (e.g., 0, 1, . . . 30, 31). In some cases, an indication of the index is received, enabling a read/write channel to select the index or location data of the segments of the codeword to be read.

At 1404, locations of where the respective sector partitions having the codeword segments reside on the multiple surfaces are determined based on the index. Based on the index, the read channel may determine, lookup, or generate location indices that indicate a mapping of respective sector partitions on the multiple surfaces where the segments of the codeword reside. For example, the index may correspond to a predefined pattern of sector partitions interleaved across at least two media surfaces of the magnetic media.

At 1406, a first codeword segment is read from a first one of the multiple surfaces based on the determined locations. The read channel may use a first read head or read circuit to read the first codeword segment from one of the media surfaces. At 1408, the first codeword segment read from the first surface is buffered. In aspects, the read channel may use an interleave read buffer to store codeword segments that are read from the multiple media surfaces. For example, the interleave read buffer may be configured similar to the interleave buffer 306 except for that codeword segments are written to the buffer as read off the multiple surfaces and the interleaver can reconstruct codewords by transferring codeword segments from the read buffer in an order based on the interleave index.

At 1410, a second codeword segment is read from a second one of the multiple surfaces based on the determined locations. The read channel may use a second read head or read circuit to read the second codeword segment from one of the media surfaces. In some cases, the read channel uses the first and second read heads in parallel to read codeword segments from respective media surfaces at a same time. Alternatively, the read channel uses the first and second read head in serial fashion to jump between the media surfaces to read the segments sequentially as the read heads encounter sector partitions as the media disk rotates.

At 1412, the second codeword segment read from the second surface is buffered. As noted, the read channel may use an interleave read buffer to store codeword segments that are read from the multiple media surfaces. In aspects, the first and second codeword segments are buffered in an order as those segments are read back from the media and the interleaver can re-order or transfer the segments from the interleave read buffer in a different order, such as based on an interleave index assigned to a codeword being read back. Optionally, from operation 1412, the method 1400 may iteratively return to operation 1410 to read additional segments of a codeword (e.g., 4 to 64 segments per codeword) and buffer the additional codeword segments for use (e.g., combining) with other buffered codeword segments.

At 1414, the codeword is reconstructed from the buffered codeword segments read from the multiple surfaces. In aspects, the interleaver may re-order and/or combine codeword segments from a buffer to reconstruct and decode the codeword from the codeword segments read from the multiple media surfaces. In some cases, reading the codeword segments interleaved across multiple media surfaces maintains or increases read throughput relative to reading codewords from a set of non-contiguous set of media track sectors. Thus, aspects of codeword interleaving over multiple media surfaces may provide improved data reliability without reducing performance (e.g., IOPs) of a media drive.

Figure 15:
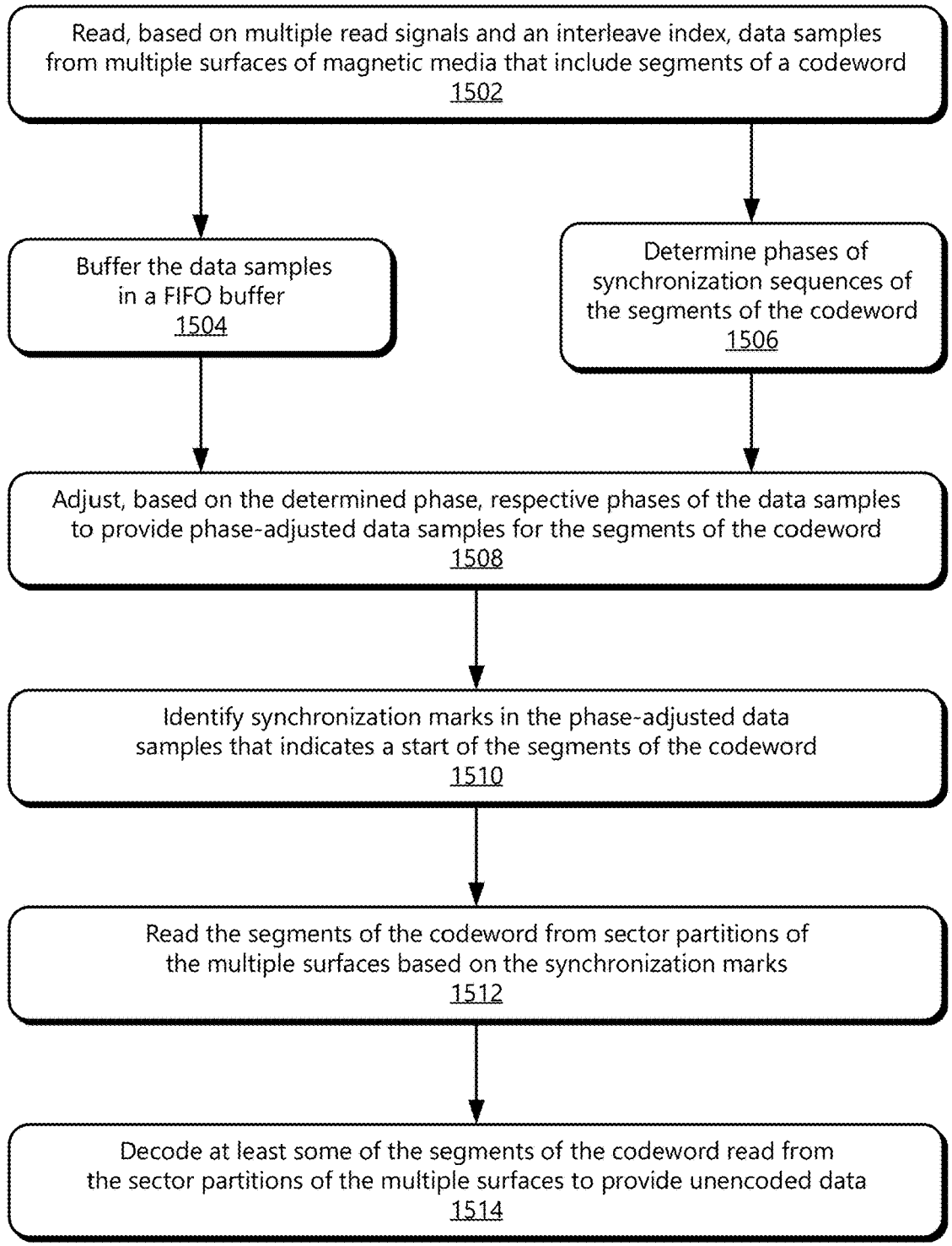
FIG. 15 depicts an example method for reading segments of a codeword from surfaces of magnetic media with buffered timing recovery.

FIG. 15 depicts an example method 1500 for reading segments of a codeword from surfaces of magnetic media with buffered timing recovery. The operations of method 1500 may be performed by or with the read/write channel 140, interleaver 142, interleave indices 144, segment-surface address data 146, and/or buffered timing recovery circuit 148.

At 1502, data samples are read from multiple surfaces of magnetic media that include segments of a codeword. In aspects, the data samples are read from the multiple surfaces based on multiple read signals and an interleave index that indicates on which of the multiple surfaces the segments of the codeword are located. The respective sector partitions of the multiple surfaces may store or include segments of a codeword of encoded data. In some cases, the segments of the codeword were written to the multiple surfaces based on the interleave index, which may enable reading of the segments by using the same interleave index.

At 1504, the data samples of the codeword segments are buffered in a first-in-first-out (FIFO). The data samples may be buffered in parallel or at least partially during a phase determination or phase computation of a synchronization sequence of the segments of the codeword or sector partitions. At 1506, phase of a synchronization sequences of the segments of the codeword are determined. The phase of the synchronization sequence may be determined or computed in parallel or at least partially while the data samples are buffered.

At 1508, respective phase of the data samples is adjusted to provide phase-adjusted or phase-corrected data samples for the segments of the codeword. This may enable a synchronization mark (e.g., sub-sector sync marks) of the segments to be found without the use of a conventional long synchronization sequence (e.g., such that phase must be calculated before encountering the synchronization mark). At 1510, synchronization marks (e.g., sub-sector sync marks) in the phase-adjusted data samples are identified that indicate a start (or location in the data samples) of the segments of the codeword. For example, one or more readback circuits of the read/write channel may identify a proper start of one of the multiple codeword segments read from respective sectors of the multiple surfaces.

At 1512, the segments of the codeword are read from sector partitions of the multiple surfaces based on the synchronization marks. For example, the codeword segments may be identified using the synchronization marks and extracted from the data samples read from the respective sectors of the media surfaces. The segments of one or more codewords may be read from respective partitions of the sectors of the multiple surfaces that are assigned to an interleaver group. In aspects, the segments of one or more codewords may be read serially from the multiple surfaces or in parallel from the multiple surfaces, such that read throughput is maintained or increased over reading sectors sequentially from one track of one surface. At 1514, at least some of the segments of the codeword read from the sector partitions of the multiple surfaces are decoded to provide unencoded data (e.g., user data). In some cases, the unencoded data is combined with unencoded data of other codewords to provide a larger portion of user data or a logical block of user data.

System-on-Chip and Controller

Figure 16:
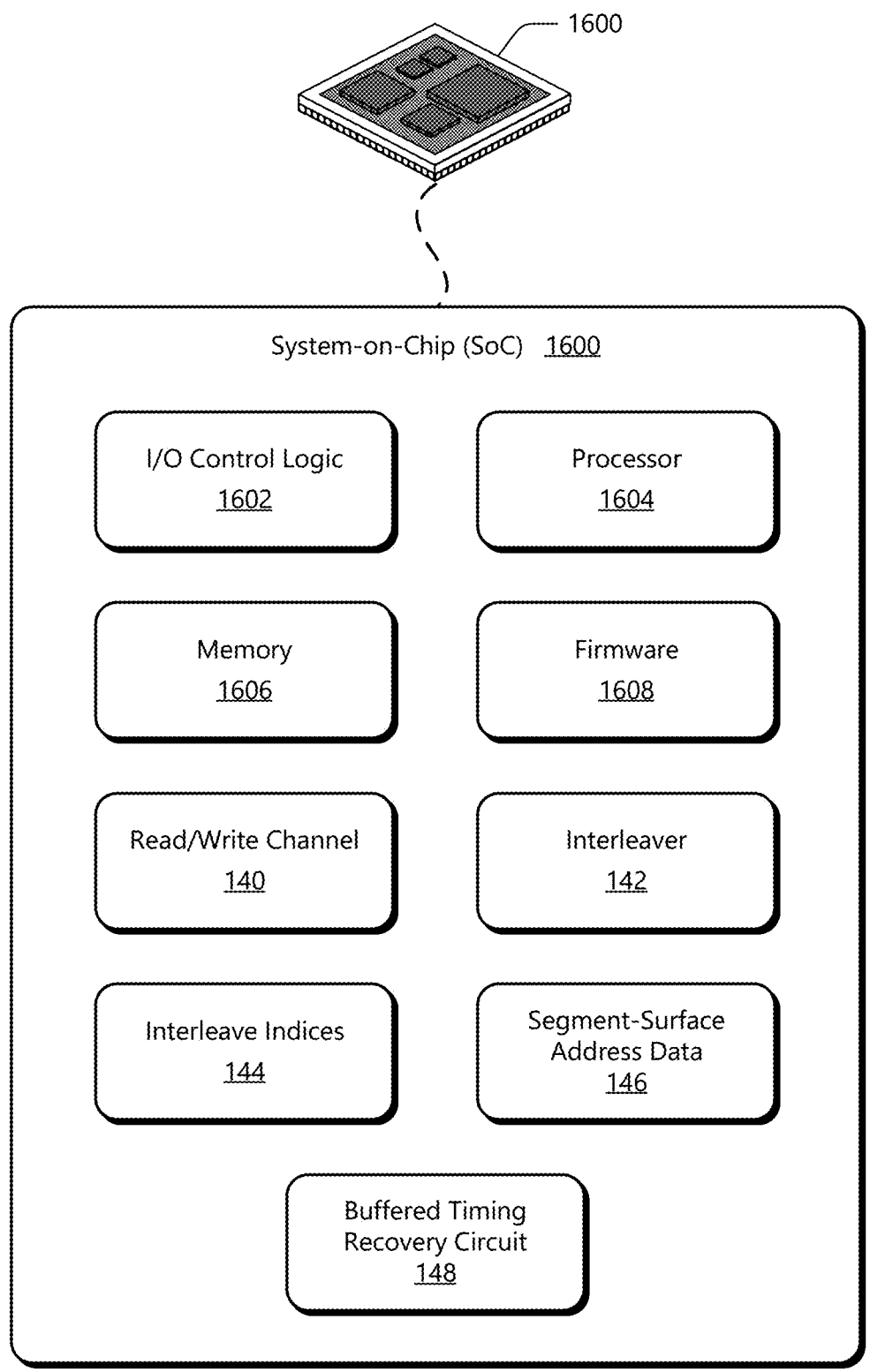
FIG. 16 illustrates an example System-on-Chip (SoC) environment for implementing aspects of codeword interleaving over magnetic media surfaces.

FIG. 16 illustrates an example System-on-Chip (SoC) 1600 that may implement various aspects of codeword interleaving over magnetic media surfaces. The SoC 1600 may be implemented in any suitable device, such as a smart-phone, netbook, tablet computer, access point, network-attached storage, camera, smart appliance, printer, set-top box, server, solid-state drive (SSD), magnetic tape drive, hard-disk drive (HDD), storage drive array, memory module, storage media controller, storage media interface, head-disk assembly, magnetic media pre-amplifier, automotive computing system, or any other suitable type of device (e.g., others described herein). Although described with reference to a SoC, the entities of FIG. 16 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

In this example, the SoC 1600 is shown with various components that include input-output (I/O) control logic 1602 and a hardware-based processor 1604 (processor 1604), such as a microprocessor, processor core, application processor, DSP, or the like. The SoC 1600 also includes memory 1606, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1604 and code (e.g., firmware) stored on the memory 1606 are implemented as a storage media controller or as part of a storage media interface to provide various functionalities (e.g., read/write channel functions) associated with codeword interleaving over magnetic media surfaces. In the context of this disclosure, the memory 1606 stores data, code, instructions, or other information via non-transitory signals, and does not include carrier waves or transitory signals. Alternatively or additionally, SoC 1600 may comprise a data interface (not shown) for accessing additional or expandable off-chip storage media, such as magnetic memory or solid-state memory (e.g., Flash or NAND memory).

The SoC 1600 may also include firmware 1608, applications, programs, software, and/or operating system, which may be embodied as processor-executable instructions maintained on the memory 1606 for execution by the processor 1604 to implement functionalities of the SoC 1600. The SoC 1600 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1600. For example, the SoC 1600 may include a transceiver interface configured to enable storage over a wired or wireless network, such as to provide a network attached storage (NAS) device with codeword interleaving features.

In this example, the SoC 1600 also includes a read/write channel 140, an interleaver 142, interleave indices 144, segment-surface address data 146, and a buffered timing recovery circuit 148, which may be implemented separately as shown or combined with a storage component or data interface. Alternatively or additionally, the SoC 1600 may include interfaces to a pre-amplifier, storage media controller, and/or a spindle/motor assembly of a magnetic media disk drive. As described herein, the interleaver 142 may partition sectors, segment codewords, select interleave indices (for write or read operations), interleave codeword segments for writing to storage media, aggregate codeword segments read from storage media, or any combination of the like to implement aspects of codeword interleaving over magnetic media surfaces. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, FIG. 3, and/or FIG. 4. The interleaver 142, either in whole or part, may be implemented as digital logic, circuitry, and/or processor-executable instructions maintained by the memory 1606 and executed by the processor 1604 to implement various aspects or features of codeword interleaving over magnetic media surfaces.

The interleaver 142, may be implemented independently or in combination with any suitable component or circuitry to implement aspects described herein. For example, an interleaver may be implemented as part of a DSP, processor/storage bridge, I/O bridge, graphics processing unit, memory controller, storage controller, arithmetic logic unit (ALU), or the like. The interleaver 142 may also be provided integral with other entities of SoC 1600, such as integrated with the processor 1604, memory 1606, a storage media interface, or firmware 1608 of the SoC 1600. Alternatively or additionally, the interleaver 142, and/or other components of the SoC 1600 may be implemented as hardware, firmware, fixed logic circuitry, or any combination thereof.

Figure 17:
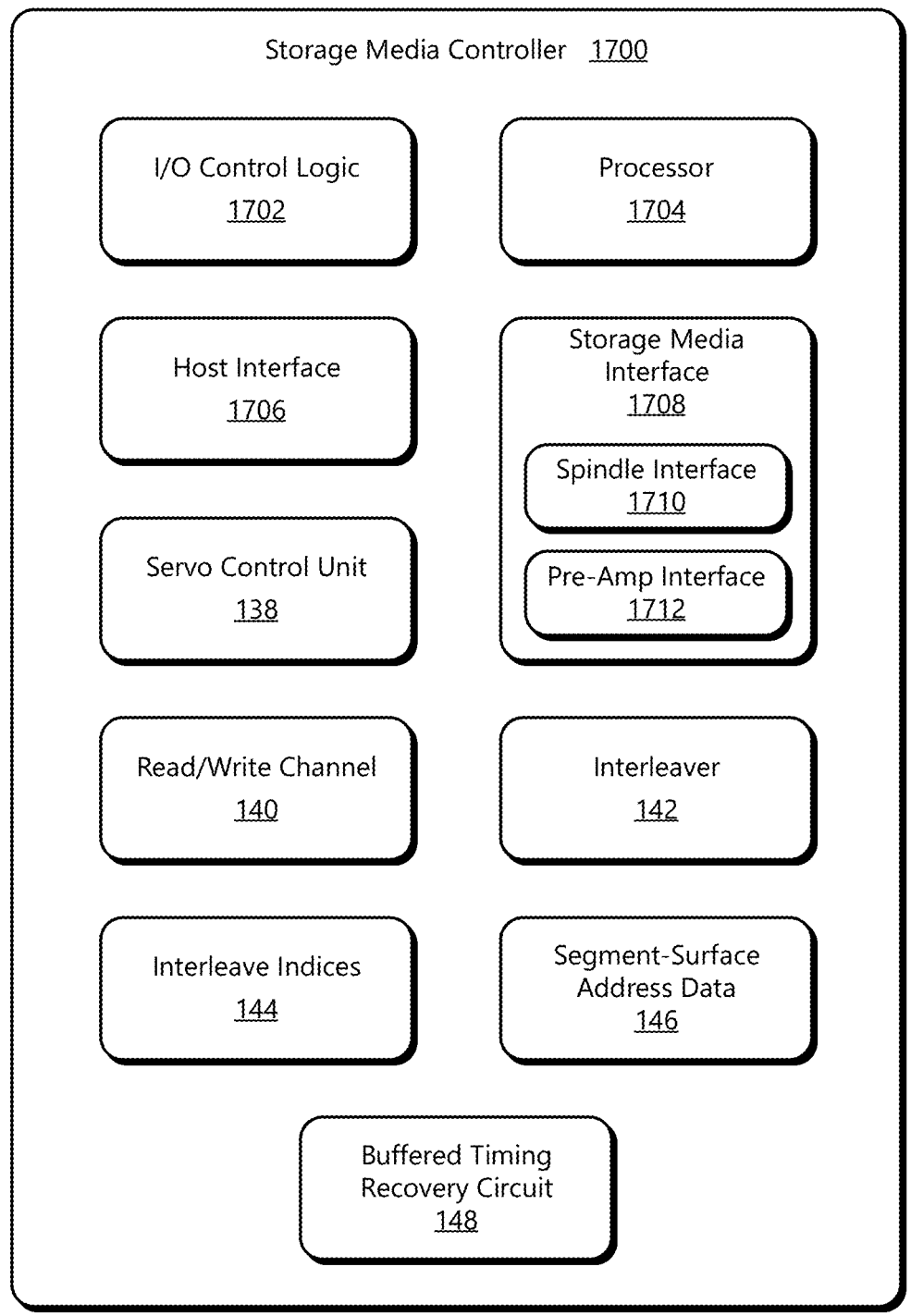
FIG. 17 illustrates an example storage media controller configured to implement aspects of codeword interleaving over magnetic media surfaces.

As another example, consider FIG. 17 which illustrates an example storage media controller 1700 in accordance with one or more aspects of codeword interleaving over magnetic media surfaces. Generally, the storage media controller 1700 enables the computing device 102 to access contents of magnetic storage media, such as an operating system, applications, or data for applications or other services. The storage media controller may also write and read data of the computing device 102 to and from the magnetic storage media with which the controller is associated. In various aspects, the storage media controller 1700 or any combination of components thereof may be implemented as a storage drive controller (e.g., HDD controller or HDD chipset), storage media controller, NAS controller, storage media interface, storage media endpoint, storage media target, or a storage aggregation controller for magnetic storage media, solid-state storage media, or the like (e.g., hybrid SSD/HDD storage systems). In some cases, the storage media controller 1700 is implemented similar to or with components of the SoC 1600 as described with reference to FIG. 16. In other words, an instance of the SoC 1600 may be configured as a storage media controller, such as the storage media controller 1700 to manage magnetic storage media. In this example, the storage media controller 1700 includes input-output (I/O) control logic 1702 and a processor 1704, such as a microprocessor, microcontroller, processor core, application processor, DSP, or the like. The storage media controller also includes a host interface 1706 (e.g., SATA, PCIe, NVMe, or Fabric interface) and a storage media interface 1708 (e.g., magnetic media interface or head-disk assembly (HDA) interface), which enable access to a host system (or fabric) and storage media, respectively. In this example, the storage media interface includes separate instances of a spindle interface 1710 and a pre-amp interface 1712, such as to enable communication with a head-disk assembly of a media drive.

In some aspects, the storage media controller 1700 implements aspects of codeword interleaving over magnetic media surfaces when managing or enabling access to storage media that is coupled to the storage media interface 1708. The storage media controller 1700 may provide a storage interface for a host system via the host interface 1706, through which storage access commands, such as data to write to the magnetic storage media are received from the host system. As shown in FIG. 17, the storage media controller 1700 may also include a servo control unit 138, read/write channel 140, and an interleaver 142 for implementing aspects of codeword interleaving. In this example, the storage media controller also includes interleave indices 144 and an index selector 304, which may be implemented or accessed by the interleaver 142 as described herein. Although not shown, the read/write channel 140 or the interleaver 142 may also include segment-surface address data 146 and a buffered timing recovery circuit 148 for reading back segments of codewords from sector partitions. The servo control unit 138 is operably coupled to the spindle interface 1710 and may provide spindle or voice coil control for a magnetic media drive. In some aspects, the processor 1704 and firmware or logic of the storage media controller 1700 are implemented to provide the interleaver 142 and/or various data writing or processing functionalities associated with codeword interleaving over magnetic media surfaces.

The interleaver 142 of the storage media controller 1700 may be implemented separately as shown or combined with the processor 1704, read/write channel 140, or storage media interface 1708. In accordance with various aspects, the interleaver 142 may partition sectors, segment codewords, interleave codeword segments for writing to storage media, aggregate codeword segments read from storage media, or any combination of the like. Examples of these components and/or entities, or corresponding functionality, are described with reference to the respective components or entities of the environment 100 of FIG. 1 or respective configurations illustrated in FIGS. 2, FIG. 3, and/or FIG. 4. The interleaver 142, either in whole or part, may be implemented as processor-executable instructions maintained by memory of the controller and executed by the processor 1704 to implement various aspects and/or features of codeword interleaving over magnetic media surfaces.

In the following, some examples of codeword interleaving over magnetic media surfaces are described in accordance with one or more aspects:

Example 1: A method for codeword interleaving over magnetic media surfaces, comprising: receiving data to be written to the magnetic media surfaces, encoding the data to provide one or more codewords of encoded data, determining, for each of the one or more codewords, a respective index that indicates which of the magnetic media surfaces that segments of the codewords are to be written, placing the segments of the one or more codewords into an interleaver based on the respective index that corresponds to the codeword, and writing, from the interleaver, the segments of the one or more codewords to sector partitions of at least two of the magnetic media surfaces to interleave the segments of the one or more codewords over the magnetic media surfaces.

Example 2: The method of example 1, wherein: the respective indices that correspond to each codeword include pre-defined indices, and the method further comprises: receiving, from a storage media controller, an indication of which pre-defined index corresponds to at least one of the codewords.

Example 3: The method of example 1 or example 2, further comprising determining, for at least one of the codewords, a location index for where the segments of the codeword are to be written to respective sector partitions of at least two of the magnetic media surfaces.

Example 4: The method of any of examples 1 to 3, further comprising: inserting, for each of the codewords, identifiers into the segments of the codeword interleaved over the magnetic media surfaces to enable identification of the segments that correspond to the codeword during or after read back of the segments from the at least two magnetic media surfaces.

Example 5: The method of example 4, wherein the identifiers comprise sub-sector preambles or sub-sector synchronization indicators, and the sub-sector preambles or sub-sector synchronization indicators in the segments are: unique to the codeword to enable identification of the segments that correspond to the codeword, and/or sequentially assigned to the segments to enable ordering of the segments of the codeword during or after read back of the segments from the at least two magnetic media surfaces.

Example 6: The method of any of examples 1 to 5, further comprising: segmenting, for each of the codewords, the encoded data of the codeword into a number of segments, the number of segments ranging from two segments per codeword to 64 segments per codeword, and wherein: the encoded data of the segments of the codeword is encoded with an error-correcting code that enables decoding of the codeword with fewer than all of the segments of the codeword.

Example 7: The method of any of examples 1 to 6, wherein the writing comprises: writing a first segment of one of the codewords to a first sector partition on a first one of the at least two magnetic media surfaces, and writing, during a same revolution of the magnetic media surfaces, a second segment of the codeword to a second sector partition on a second one of the at least two magnetic media surfaces, the second sector partition being offset from the first sector partition.

Example 8: The method of any of examples 1 to 6, wherein the writing comprises: writing a first segment of one of the codewords to a first sector partition on a first one of the at least two magnetic media surfaces, and writing, during a same revolution of the magnetic media surfaces, a second segment of the codeword to a second sector partition on a second one of the at least two magnetic media surfaces, the second sector partition not offset from the first sector partition.

Example 9: The method of any of examples 1 to 6, wherein the writing comprises: writing a first segment of a first one of the codewords to a first sector partition on a first one of the at least two magnetic media surfaces, writing a first segment of a second one of the codewords to a second sector partition on a second one of the at least two magnetic media surfaces, the second sector partition not offset from the first sector partition, writing a second segment of the first codeword to a third sector partition on the second magnetic media surface, and writing a second segment of the second codeword to a fourth sector partition on the first magnetic media surface, the fourth sector partition not offset from the third sector partition.

Example 10: The method of any of examples 1 to 6, wherein the writing comprises: writing a first set of the segments of the one or more codewords assigned a first track parity to one of the at least two magnetic media surfaces, and writing a second set of the segments of the one or more codewords assigned a second track parity to multiple surfaces of the at least two magnetic media surfaces.

Example 11: The method of example 10, wherein: the first track parity comprises an odd track parity, the second track parity comprises an even track parity, the first set of segments of the one or more codewords are written to the odd tracks of the first magnetic media surface, and the second set of segments of the one or more codewords are interleaved over odd tracks of the at least two magnetic media surfaces, or the first track parity comprises an even track parity, the second track parity comprises an odd track parity, the first set of segments of the one or more codewords are written to the even tracks of the first magnetic media surface, and the second set of segments of the one or more codewords are interleaved over even tracks of the at least two magnetic media surfaces.

Example 12: The method of any of examples 1 to 6, further comprising: maintaining, for the one or more codewords, segment-surface address data that is useful to determine locations on the at least two magnetic media surfaces at which the segments of the one or more codewords are written.

Example 13: The method of example 12, wherein the segment-surface address data is maintained as a lookup table associated with a logical address block table that enables access to the segments of a selected codeword based on a logical address of the selected codeword.

Example 14: An apparatus comprising: an interface to receive data from a host, at least one disk of magnetic storage media, each of the at least one disks having two magnetic media surfaces that are arranged into sectors for storing the data, an interleave buffer configured to buffer segments of codewords for writing to the sectors of the magnetic media surfaces of the at least one disk, and an interleaver configured to implement any one of the methods of examples 1 to 13 to implement codeword interleaving over the magnetic media surfaces of the at least one disk.

Example 15: A System-on-Chip (SoC) comprising: an interface to a storage media controller from which data is received for writing to magnetic storage media, an interface to a media writer of the magnetic storage media, an interleave buffer configured to buffer segments of codewords for writing to multiple surfaces of the magnetic storage media, and an interleaver configured to implement any one of the methods of examples 1 to 13 to implement codeword interleaving over the multiple magnetic media surfaces.

Although the subject matter of codeword interleaving over magnetic media surfaces has been described in language specific to structural features and/or methodological operations, it is to be understood that the subject matter defined in the appended claims is not necessarily limited to the specific examples, features, configurations, or operations described herein, including orders in which they are performed.

What is claimed is:

1. A method for codeword interleaving over magnetic media surfaces, comprising:
   receiving data to be written to the magnetic media surfaces;
   encoding the data to provide one or more codewords of encoded data;
   determining, for each of the one or more codewords, a respective index that indicates which of the magnetic media surfaces that segments of the codewords are to be written;
   arrange the segments of the one or more codewords into an interleaver based on the respective index that corresponds to the codeword; and
   writing, from the interleaver, the segments of the one or more codewords to sector partitions of at least two of the magnetic media surfaces to interleave the segments of the one or more codewords over the magnetic media surfaces.

2. The method of claim 1, wherein:
   the respective indices that correspond to each codeword include pre-defined indices, and the method further comprises:
   receiving, from a storage media controller, an indication of which pre-defined index corresponds to at least one of the codewords.

3. The method of claim 1, further comprising determining, for at least one of the codewords, a location index for where the segments of the codeword are to be written to respective sector partitions of at least two of the magnetic media surfaces.

4. The method of claim 1, further comprising:
   inserting, for each of the codewords, identifiers into the segments of the codeword interleaved over the magnetic media surfaces to enable identification of the segments that correspond to the codeword during or after read back of the segments from the at least two magnetic media surfaces.

5. The method of claim 4, wherein the identifiers comprise sub-sector preambles or sub-sector synchronization indicators, and
   the sub-sector preambles or sub-sector synchronization indicators in the segments are:
   unique to the codeword to enable identification of the segments that correspond to the codeword; or
   sequentially assigned to the segments to enable ordering of the segments of the codeword during or after read back of the segments from the at least two magnetic media surfaces.

6. The method of claim 1, further comprising:
   segmenting, for each of the codewords, the encoded data of the codeword into a number of segments, the number of segments ranging from two segments per codeword to 64 segments per codeword, and wherein:
   the encoded data of the segments of the codeword is encoded with an error-correcting code that enables decoding of the codeword with fewer than all of the segments of the codeword.

7. The method of claim 1, wherein the writing comprises:
   writing a first segment of one of the codewords to a first sector partition on a first one of the at least two magnetic media surfaces; and
   writing, during a same revolution of the magnetic media surfaces, a second segment of the codeword to a second sector partition on a second one of the at least two magnetic media surfaces, the second sector partition being offset from the first sector partition.

8. The method of claim 1, further comprising:
maintaining, for the one or more codewords, segment-surface address data that is useful to determine locations on the at least two magnetic media surfaces at which the segments of the one or more codewords are written.

9. The method of claim 8, wherein the segment-surface address data is maintained as a lookup table associated with a logical address block table that enables access to the segments of a selected codeword based on a logical address of the selected codeword.

10. An apparatus comprising:
an interface to receive data from a host;
at least one disk of magnetic storage media comprising at least two magnetic media surfaces that are arranged into sectors for storing the data;
an interleave buffer configured to buffer segments of codewords for writing to the sectors of the at least two magnetic media surfaces; and
an interleaver configured to:
encode the data to provide one or more codewords of encoded data;
determine, for each of the one or more codewords, a respective index that indicates which of the magnetic media surfaces that segments of the codewords are to be written;
arrange the segments of the one or more codewords into an interleaver based on the respective index that corresponds to the codeword; and
write, from the interleaver, the segments of the one or more codewords to sector partitions of at least two of the magnetic media surfaces to interleave the segments of the one or more codewords over the magnetic media surfaces.

11. The apparatus of claim 10, wherein the apparatus further comprises a storage media controller, the respective indices that correspond to each codeword include pre-defined indices, and the interleaver is further configured to:
receive, from the storage media controller, an indication of which pre-defined index corresponds to at least one of the codewords.

12. The apparatus of claim 10, wherein the interleaver is further configured to determine, for at least one of the codewords, a location index for where the segments of the codeword are to be written to respective sector partitions of at least two of the magnetic media surfaces.

13. The apparatus of claim 10, wherein the interleaver is further configured to:
insert, for each of the codewords, identifiers into the segments of the codeword interleaved over the magnetic media surfaces to enable identification of the segments that correspond to the codeword during or after read back of the segments from the at least two magnetic media surfaces.

14. The apparatus of claim 13, wherein the identifiers comprise sub-sector preambles or sub-sector synchronization indicators, and
the sub-sector preambles or sub-sector synchronization indicators in the segments are:
unique to the codeword to enable identification of the segments that correspond to the codeword; or
sequentially assigned to the segments to enable ordering of the segments of the codeword during or after read back of the segments from the at least two magnetic media surfaces.

15. The apparatus of claim 10, wherein to write the segments of the one or more codewords, the interleaver is further configured to:
write a first segment of one of the codewords to a first sector partition on a first one of the at least two magnetic media surfaces, and
write, during a same revolution of the magnetic media surfaces, a second segment of the codeword to a second sector partition on a second one of the at least two magnetic media surfaces, the second sector partition not offset from the first sector partition.

16. A System-on-Chip (SoC) comprising:
an interface to a storage media controller from which data is received for writing to magnetic storage media;
an interface to a media writer of the magnetic storage media;
an interleave buffer configured to buffer segments of codewords for writing to at least two magnetic media surfaces of the magnetic storage media; and
an interleaver configured to:
encode the data to provide one or more codewords of encoded data;
determine, for each of the one or more codewords, a respective index that indicates which of the magnetic media surfaces that segments of the codewords are to be written;
arrange the segments of the one or more codewords into an interleaver based on the respective index that corresponds to the codeword; and
write, from the interleaver, the segments of the one or more codewords to sector partitions of at least two of the magnetic media surfaces to interleave the segments of the one or more codewords over the magnetic media surfaces.

17. The SoC of claim 16, wherein the respective indices that correspond to each codeword include pre-defined indices, and the interleaver is further configured to:
receive, from the storage media controller, an indication of which pre-defined index corresponds to at least one of the codewords.

18. The SoC of claim 16, wherein the interleaver is further configured to determine, for at least one of the codewords, a location index for where the segments of the codeword are to be written to respective sector partitions of at least two of the magnetic media surfaces.

19. The SoC of claim 16, wherein the interleaver is further configured to:
insert, for each of the codewords, identifiers into the segments of the codeword interleaved over the magnetic media surfaces to enable identification of the segments that correspond to the codeword during or after read back of the segments from the at least two magnetic media surfaces.

20. The SoC of claim 16, wherein to write the segments of the one or more codewords, the interleaver is further configured to:
write a first segment of a first one of the codewords to a first sector partition on a first one of the at least two magnetic media surfaces;
write a first segment of a second one of the codewords to a second sector partition on a second one of the at least two magnetic media surfaces, the second sector partition not offset from the first sector partition;

write a second segment of the first codeword to a third sector partition on the second magnetic media surface; and write a second segment of the second codeword to a fourth sector partition on the first magnetic media surface, the fourth sector partition not offset from the third sector partition.

* * * * *